US011119389B2

(12) United States Patent
Owaki

(10) Patent No.: US 11,119,389 B2
(45) Date of Patent: Sep. 14, 2021

(54) IMAGE-CAPTURING APPARATUS AND HOUSING COMPONENT

(71) Applicant: SONY SEMICONDUCTOR SOLUTIONS CORPORATION, Kanagawa (JP)

(72) Inventor: Hirofumi Owaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/964,575

(22) PCT Filed: Nov. 20, 2018

(86) PCT No.: PCT/JP2018/042760
§ 371 (c)(1),
(2) Date: Jul. 23, 2020

(87) PCT Pub. No.: WO2019/155722
PCT Pub. Date: Aug. 15, 2019

(65) Prior Publication Data
US 2021/0041767 A1    Feb. 11, 2021

(30) Foreign Application Priority Data

Feb. 6, 2018   (JP) .............................. JP2018-018785

(51) Int. Cl.
*G03B 17/08*    (2021.01)
*H04N 5/225*    (2006.01)
*B60R 11/04*    (2006.01)

(52) U.S. Cl.
CPC ........... *G03B 17/08* (2013.01); *H04N 5/2253* (2013.01); *B60R 11/04* (2013.01)

(58) Field of Classification Search
CPC ......... G03B 17/08; G03B 17/02; B60R 11/04; H04N 5/2253
(Continued)

(56) References Cited

U.S. PATENT DOCUMENTS 3,640,424 A * 2/1972 Ando ..................... G03B 17/08
220/288
4,072,245 A * 2/1978 Sloan, Jr. ........... B60K 15/0406
16/2.2
(Continued)

FOREIGN PATENT DOCUMENTS

| JP | 62-194248 U | 12/1987 |
| JP | 3008100 U | 3/1995 |
| JP | 2015-161780 A | 9/2015 |

OTHER PUBLICATIONS

International Search Report and Written Opinion of PCT Application No. PCT/JP2018/042760, dated Feb. 26, 2019, 09 pages of ISRWO.

*Primary Examiner* — Christopher E Mahoney
(74) *Attorney, Agent, or Firm* — Chip Law Group

(57) ABSTRACT

An image-capturing apparatus according to an embodiment of the present technology includes a first case, a second case, a connection mechanism, and an elastic member. The first case includes a first pressing surface. The second case includes a second pressing surface arranged to face the first pressing surface, and is connected to the first case. The connection mechanism is capable of connecting the first and second cases. The elastic member includes a first contact portion and a second contact portion in at least some of cross-sections of the elastic member, the first contact portion being brought into contact with the first pressing surface, the second contact portion being brought into contact with the second pressing surface, the elastic member including a plurality of the second contact portions, the elastic member (Continued)

hermetically sealing a space between the first and second pressing surfaces.

17 Claims, 16 Drawing Sheets

(58) Field of Classification Search
USPC .......................................... 396/25, 27; 348/81
See application file for complete search history.

(56) References Cited

U.S. PATENT DOCUMENTS

| | | | | |
|---|---|---|---|---|
| 4,510,664 | A * | 4/1985 | Lock | B29C 65/02 |
| | | | | 29/450 |
| 4,690,414 | A * | 9/1987 | Haaland | F16L 17/035 |
| | | | | 277/616 |
| 4,803,504 | A * | 2/1989 | Maeno | G03B 17/08 |
| | | | | 396/29 |
| 5,946,501 | A | 8/1999 | Hayakawa | |
| 9,190,638 | B2 * | 11/2015 | Lee | H01M 2/1077 |
| 2015/0205186 | A1 * | 7/2015 | Park | G03B 17/08 |
| | | | | 348/373 |

\* cited by examiner

IMAGE-CAPTURING APPARATUS AND HOUSING COMPONENT

CROSS REFERENCE TO RELATED APPLICATIONS

This application is a U.S. National Phase of International Patent Application No. PCT/JP2018/042760 filed on Nov. 20, 2018, which claims priority benefit of Japanese Patent Application No. JP 2018-018785 filed in the Japan Patent Office on Feb. 6, 2018. Each of the above-referenced applications is hereby incorporated herein by reference in its entirety.

TECHNICAL FIELD

The present technology relates to an image-capturing apparatus and a housing component that are applicable to a vehicle-mounted camera and the like.

BACKGROUND ART

Patent Literature 1 discloses a technology for a waterproof case of a vehicle-mounted camera, the technology making it possible to prevent warpage of a rear case included in the waterproof case and to prevent a decrease in a waterproof performance, even if fewer screws are used (for example, paragraphs [0020] and [0021] in the specification of Patent Literature 1).

CITATION LIST

Patent Literature

Patent Literature 1: Japanese Patent Application Laid-open No. 2015-161780

DISCLOSURE OF INVENTION

Technical Problem

A vehicle-mounted camera and the like are expected to continue to become smaller, and thus, there is a need for a technology that makes it possible to achieve a high waterproof performance and to provide a smaller apparatus.

In view of the circumstances described above, it is an object of the present technology to provide an image-capturing apparatus and a housing component that make it possible to achieve a high waterproof performance and to provide a smaller apparatus.

Solution to Problem

In order to achieve the object described above, an image-capturing apparatus according to an embodiment of the present technology includes a first case, a second case, a connection mechanism, and an elastic member.

The first case includes a first pressing surface.

The second case includes a second pressing surface arranged to face the first pressing surface, and is connected to the first case.

The connection mechanism is capable of connecting the first and second cases.

The elastic member includes a first contact portion and a second contact portion in at least some of cross-sections of the elastic member, the first contact portion being brought into contact with the first pressing surface, the second contact portion being brought into contact with the second pressing surface, the elastic member including a plurality of the second contact portions, the elastic member hermetically sealing a space between the first and second pressing surfaces.

In the image-capturing apparatus, the first contact portion brought into contact with the first pressing surface is formed in at least some of cross-sections of the elastic member hermetically sealing a space between the first and second pressing surfaces. Further, the plurality of the second contact portions is formed, each second contact portion being brought into contact with the second pressing surface arranged to face the first pressing surface. This makes it possible to improve a sealing performance of the elastic member. This results in being able to achieve a high waterproof performance and to provide a smaller apparatus.

The first and second cases may form an internal space by being connected to each other. In this case, the image-capturing apparatus may further include an image-capturing section that is arranged in the internal space.

The second contact portions of the plurality of the second contact portions may be formed to diverge from each other in a specified middle portion of the elastic member in a facing direction and to each extend toward the second pressing surface, the facing direction being a direction in which the first and second pressing surfaces face each other.

The elastic member may include a concave that is formed between the adjacent second contact portions of the plurality of the second contact portions.

The concave may be formed to have an opening that is larger in area at a position closer to the second pressing surface.

The plurality of the second contact portions may be formed such that ends of the respective second contact portions of the plurality of the second contact portions are situated at the same level as each other in a facing direction in which the first and second pressing surfaces face each other.

The first contact portion may include an arc-shaped end.

The first and second pressing surfaces may each be annularly formed as viewed from a facing direction in which the first and second pressing surfaces face each other. In this case, the elastic member may be annularly formed as viewed from the facing direction, and may be arranged between the first and second pressing surfaces.

At least some of cross-sections of the elastic member may include the first contact portion and the plurality of the second contact portions, the cross-sections of the elastic member being obtained by cutting the elastic member along a plane that is orthogonal to a circumferential direction of the elastic member.

Cross-sections of the elastic member may have a uniform shape, the cross-sections of the elastic member being obtained by cutting the elastic member along a plane that is orthogonal to a circumferential direction of the elastic member.

The second case may include first and second wall surfaces that face each other and extend in a facing direction from respective edges of the second pressing surface, the facing direction being a direction in which the first and second pressing surfaces face each other, the respective edges of the second pressing surface being situated opposite to each other; and an opening that is formed by respective ends of the first and second wall surfaces, and faces the second pressing surface in the facing direction. In this case, the first case may be connected to the second case such that the first pressing surface is arranged closer to the second pressing surface than the opening.

The elastic member may include a third contact portion and a fourth contact portion in the at least some of the cross-sections of the elastic member, the third contact portion being brought into contact with the first wall surface, the fourth contact portion being brought into contact with the second wall surface.

The third and fourth contact portions may be respectively arranged to be situated at the same level as each other in a facing direction in which the first and second pressing surfaces face each other.

The plurality of the second contact portions may be formed such that ends of the respective second contact portions of the plurality of the second contact portions are situated at the same level as each other in the facing direction in which the first and second pressing surfaces face each other. In this case, the third and fourth contact portions may each be arranged in a middle portion in the facing direction between an end of the first contact portion and the end of a corresponding one of the second contact portions of the plurality of the second contact portions.

The connection mechanism may include a first fastening hole that is formed in the first case, a second fastening hole that is formed in the second case and arranged to face the first fastening, and fastening members that are respectively inserted into the first and second fastening holes.

The first and second cases may each be formed of resin material.

A housing component according to an embodiment of the present technology includes the first case, the second case, the connection mechanism, and the elastic member.

Advantageous Effects of Invention

As described above, the present technology makes it possible to achieve a high waterproof performance and to provide a smaller apparatus. Note that the effect described here is not necessarily limitative and any of the effects described in the present disclosure may be provided.

MODE(S) FOR CARRYING OUT THE INVENTION

Embodiments according to the present technology will now be described below with reference to the drawings.

[Configuration of Image-Capturing Apparatus]

Figure 1:
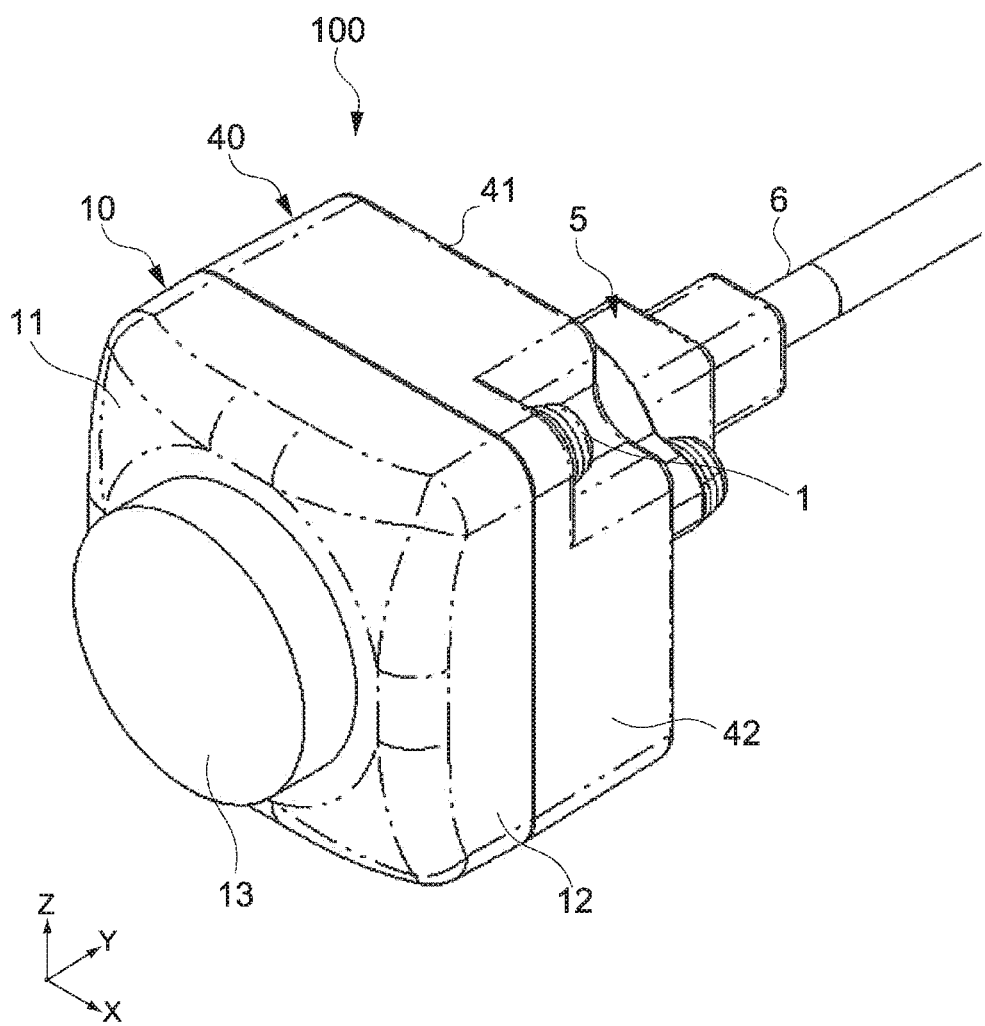
FIG. 1 schematically illustrates an appearance example of an image-capturing apparatus according to an embodiment of the present technology.

FIG. 1 schematically illustrates an example of an appearance of an image-capturing apparatus according to an embodiment of the present technology. An image-capturing apparatus 100 is used as, for example, a vehicle-mounted camera. Of course, the present technology described below is also applicable to any image-capturing apparatus that is used for other purposes.

In the following description, a left-right direction, a front-rear direction, and a height direction of the image-capturing apparatus 100 are respectively set to be an X direction, a Y direction, and a Z direction. Of course, such a setting of a direction is not limitative.

The image-capturing apparatus 100 includes a front case 10, a rear case 40, and a camera (not illustrated). The front case 10 includes a front face 11 that is arranged to be approximately orthogonal to the front-rear direction (the Y direction), and a lateral face 12 that extends backward from the periphery of the front face 11.

In the present embodiment, the front face 11 has an approximately rectangular shape as viewed from the Y direction. The lateral face 12 extends backward from four sides of the front face 11. The front case 10 is hollow, and a region surrounded by the front face 11 and the lateral face 12 is a space S1 (refer to, for example, FIG. 2). In the present embodiment, the front case 10 corresponds to a second case.

The rear case 40 includes a rear face 41 that is arranged to be approximately orthogonal to the front-rear direction (the Y direction), and a lateral face 42 that extends forward from the periphery of the rear face 41. The rear face 41 has a shape that is approximately rectangular as viewed from the Y direction and approximately identical to the shape of the front face 11. The rear case 40 is hollow, and a region surrounded by the rear face 41 and the lateral face 42 is a space S2 (refer to, for example, FIG. 6). In the present embodiment, the rear case 40 corresponds to a first case.

As illustrated in FIG. 1, the front case 10 and the rear case 40 are connected to each other using a fastening member 1 such as a screw. Specifically, an edge of the lateral face 12 of the front case 10 and an edge of the lateral face 42 of the rear case 40 are connected to each other. This results in forming an internal space that includes the spaces S1 and S2. The camera is arranged in this internal space.

As illustrated in FIG. 1, a light-transmission cover 13 that includes a transparent material is provided on the front face 11 of the front case 10. The camera is arranged such that an optical image-capturing axis of the camera passes through approximately the center of the light-transmission cover 13. The camera is capable of capturing an image according to light that enters through the light-transmission cover 13. Note that it is also possible to include a lens function in the light-transmission cover 13.

For example, a digital camera that includes an image sensor such as a complementary metal-oxide semiconductor (CMOS) sensor or a charge coupled device (CCD) sensor is used as the camera. Moreover, any camera may be used. In the present embodiment, the camera corresponds to an image-capturing section.

A connector portion 5 is provided on the rear face 41 of the rear case 40. For example, the camera is supplied with electric power and an image signal is output from the camera by a cable 6 being connected to the connector portion 5. The configuration of the connector portion 5 may be designed discretionarily.

In the present embodiment, a waterproof mechanism according to the present technology is applied to the connection between the front case 10 and the rear case 40. An embodiment of the waterproof mechanism according to the present technology is described below in detail.

Figure 2:
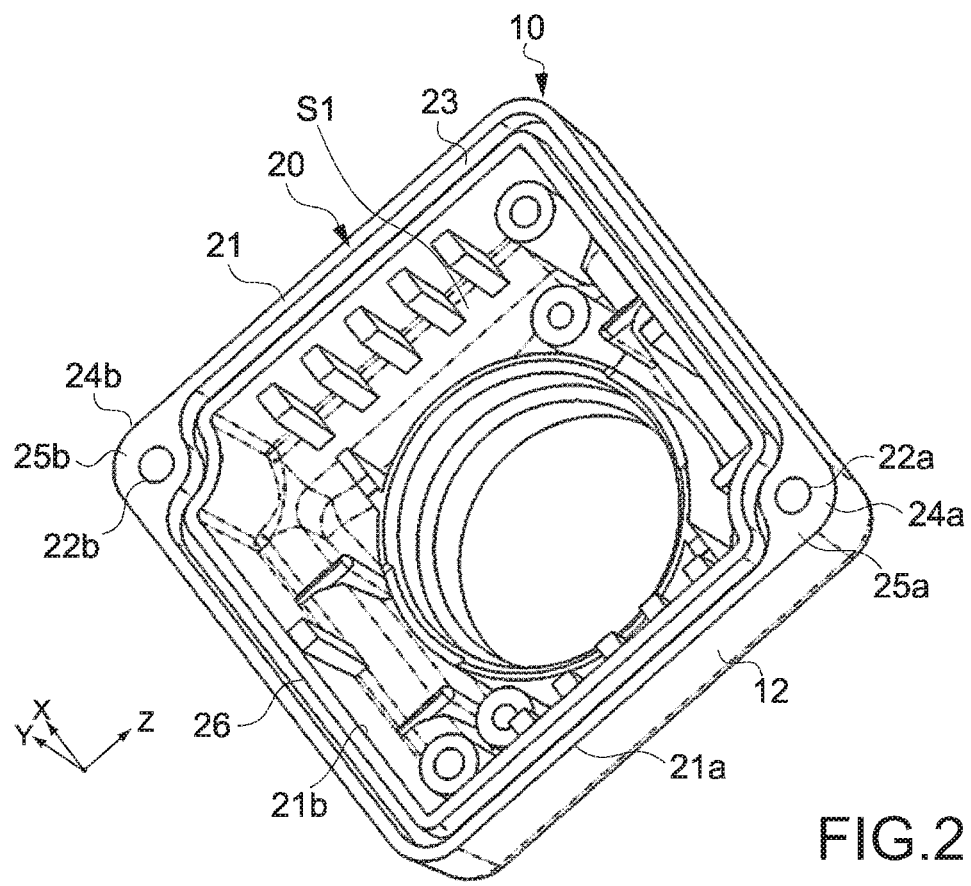
FIG. 2 is a perspective view of a configuration example of the inside of a front case.
Figure 3:
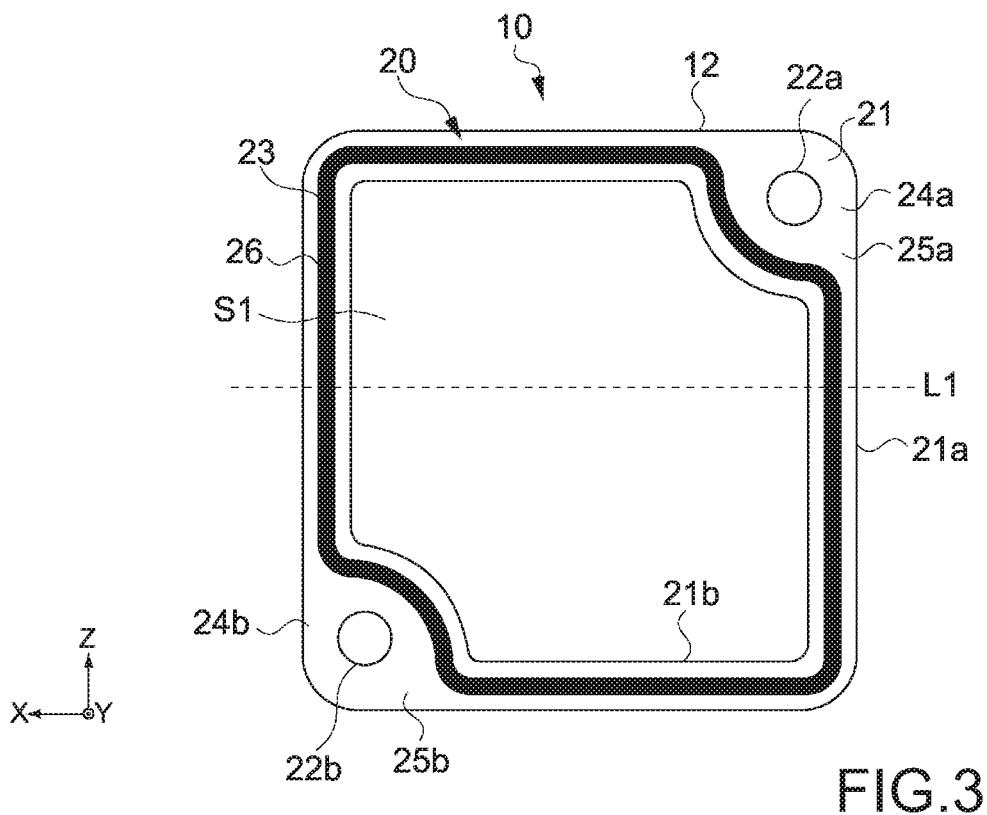
FIG. 3 schematically illustrates an edge of a lateral face of the front case.

FIG. 2 is a perspective view of a configuration example of the inside of the front case 10. FIG. 3 schematically illustrates the edge of the lateral face 12. In the following description, the edge of the lateral face 12 that is connected to the rear case 40 is referred to as a first connection portion 20.

The first connection portion 20 includes a principal surface portion 21, fastening holes 22a and 22b, and a groove 23. The principal surface portion 21 is annularly formed to have an approximately rectangular shape as viewed from the front-rear direction (the Y direction). The principal surface portion 21 is formed to surround the space S1 in the front case 10.

The principal surface portion 21 includes an outer peripheral edge 21a that has a shape that is approximately identical to an outer peripheral shape of the lateral face 12, and an inner peripheral edge 21b that is situated on the side of the space S1. Portions of the inner peripheral edge 21b that are respectively situated in two corner portions 24a and 24b from among four corner portions of the principal surface portion 21, are curved toward the space S1, the two corner portions 24a and 24b being situated diagonally to each other. Then, fastening hole regions 25a and 25b are respectively provided to regions of the corner portions 24a and 24b that are each situated between the outer peripheral edge 21a and the inner peripheral edge 21b. Note that, all around the principal surface portion 21, the surface of the principal surface portion 21 has a coplanar shape that is parallel to a plane (an XZ plane) orthogonal to the front-rear direction (the Y direction).

The fastening hole 22a and the fastening hole 22b are respectively formed in the fastening hole region 25a of the corner portion 24a and the fastening hole region 25b of the corner portion 24b. The fastening holes 22a and 22b are through-holes, and openings of the fastening holes 22a and 22b on the side of the principal surface portion 21 are situated at approximately the same level in the front-rear direction (the Y direction) as the surface of the principal surface portion 21.

The groove 23 is formed all around the principal surface portion 21. FIG. 3 illustrates the groove 23 in black. The groove 23 is annularly formed as viewed from the front-rear direction (the Y direction). Further, the groove 23 has an approximately rectangular shape as viewed from the front-rear direction (the Y direction).

As illustrated in FIG. 3, the groove 23 is formed along the inner peripheral edge 21b of the principal surface portion 21. Thus, the groove 23 is formed to pass inwardly of the fastening holes 22a and 22b in the corner portions 24a and 24b such that the groove 23 avoids the fastening holes 22a and 22b.

An opening 26 of the groove 23 is situated at approximately the same level in the front-rear direction (the Y direction) as the surface of the principal surface portion 21. In other words, the opening 26 of the groove 23 is situated at approximately the same level in the front-rear direction (the Y direction) as the openings of the fastening holes 22a and 22b on the side of the principal surface portion 21.

The packing 60 (refer to, for example, FIGS. 9A and 9B) is arranged inside the groove 223 all around the groove 223. The packing 60 has a shape that is approximately identical to the shape of the groove 223 as viewed from the front-rear direction (the Y direction). Thus, the packing 60 is annularly formed and has an approximately rectangular shape as viewed from the front-rear direction (the Y direction).

Figure 4:
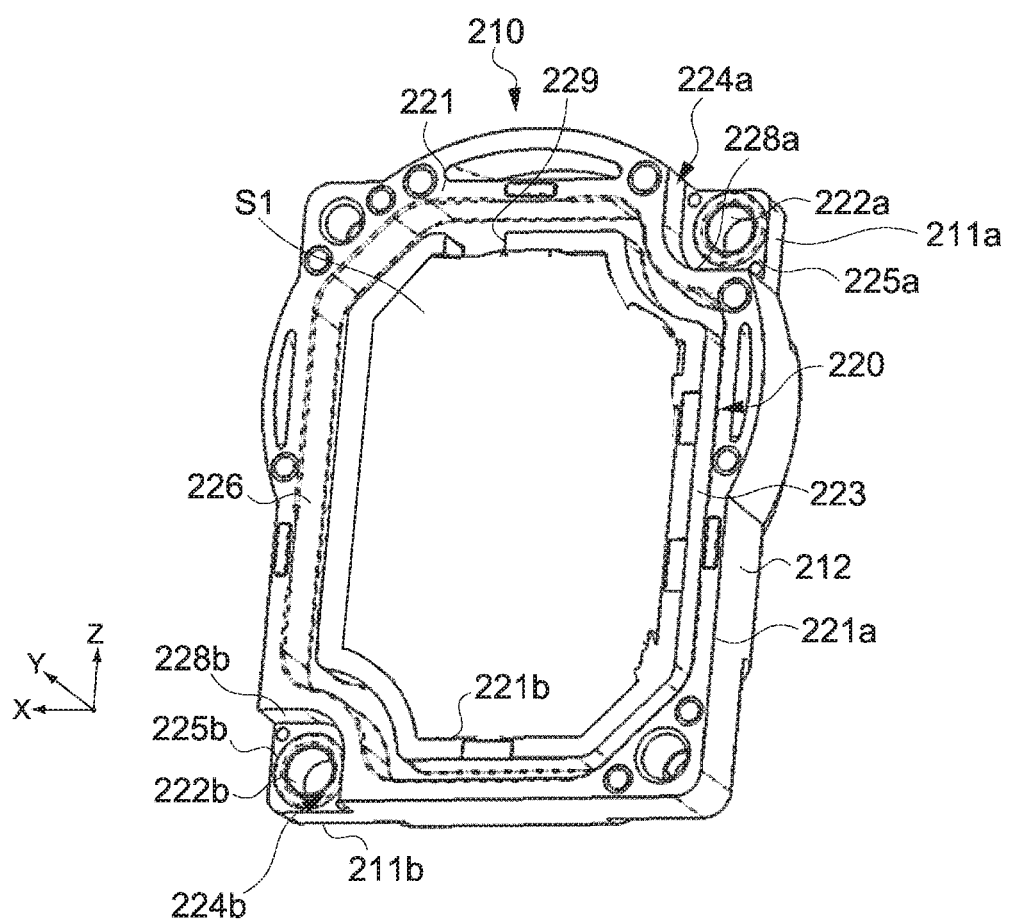
FIG. 4 is a perspective view of another configuration example of the front case.

FIG. 4 is a perspective view of another configuration example of the front case. As in the case of the front case 10 illustrated in, for example, FIG. 1, this front case 210 also includes a front face (a numerical reference thereof is omitted) and a lateral face 212. The front case 210 is hollow, and a region surrounded by the front face and the lateral face 212 is the space S1.

Note that FIG. 4 illustrates a center portion of the front case 210 in white, with a detailed configuration of the inside of the front case 210 being omitted. The center portion is provided with, for example, a light-transmission cover as appropriate.

Figure 5:
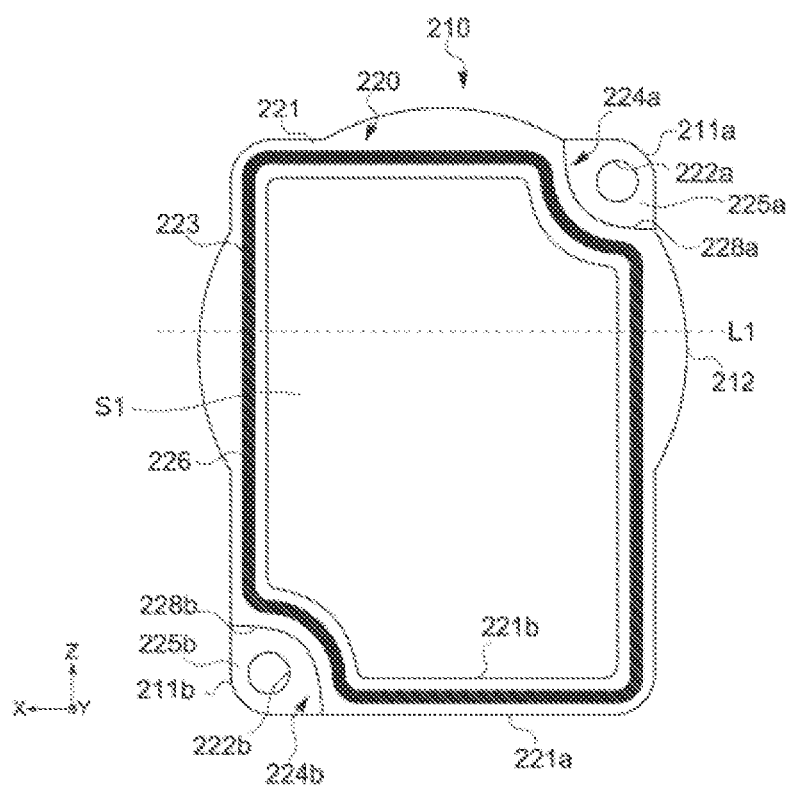
FIG. 5 schematically illustrates a first connection portion 220 of the front case illustrated in FIG. 4.

FIG. 5 schematically illustrates a first connection portion 220 of the front case 210. The first connection portion 220 includes a principal surface portion 221, fastening holes 222a and 222b, and a groove 223. The principal surface portion 221 is annularly formed to have an approximately rectangular shape as viewed from the front-rear direction (the Y direction). The principal surface portion 221 is formed to surround the space S1 in the front case 210.

The principal surface portion 221 includes an outer peripheral edge 221a and an inner peripheral edge 221b. In the front case 210 illustrated in FIGS. 4 and 5, level-difference surfaces 228a and 228b each extending forward from the outer peripheral edge 221a are respectively formed in two corner portions 224a and 224b from among four corner portions, the two corner portions 224a and 224b being situated diagonally to each other. The level-difference surfaces 228a and 228b are respectively coupled to back sides of corner portions 211a and 211b of the front face.

In the present embodiment, a region from the level-difference surface 228a to an outer edge of the corner portion 211a and a region from the level-difference surface 228b to an outer edge of the corner portion 211b are respectively provided as a fastening hole region 225a and a fastening hole region 225b. Fastening holes 222a and 222b are respectively formed in the fastening hole regions 225a and 225b. Thus, in the present embodiment, the fastening holes 222a and 222b are respectively formed in the corner portions 211a and 211b of the front face.

The fastening holes 222a and 222b are through-holes, and openings of the fastening holes 222a and 222b on the side of the principal surface portion 221 are situated anterior in the front-rear direction (the Y direction) relative to the surface of the principal surface portion 221. The difference in position between the openings of the fastening holes 222a and 222b and the surface of the principal surface portion 221 corresponds to sizes of the level-difference surfaces 228a and 228b in the front-rear direction (the Y direction).

The groove 223 is formed all around the principal surface portion 221. FIG. 5 illustrates the groove 223 in black. The groove 223 is annularly formed to have an approximately rectangular shape as viewed from the front-rear direction (the Y direction). The groove 223 is formed along the inner peripheral edge 221b of the principal surface portion 221.

An opening 226 of the groove 223 is situated at approximately the same level in the front-rear direction (the Y direction) as the surface of the principal surface portion 221. Thus, the opening 226 of the groove 223 is situated posterior in the front-rear direction (the Y direction) relative to the openings of the fastening holes 222a and 22b on the side of the principal surface portion 221.

A packing 60 (refer to, for example, FIGS. 9A and 9B) is arranged inside the groove 23 all around the groove 23. The packing 60 has a shape that is approximately identical to the shape of the groove 23 as viewed from the front-rear direction (the Y direction). Thus, the packing 60 is annularly formed and has an approximately rectangular shape as viewed from the front-rear direction (the Y direction).

Figure 6:
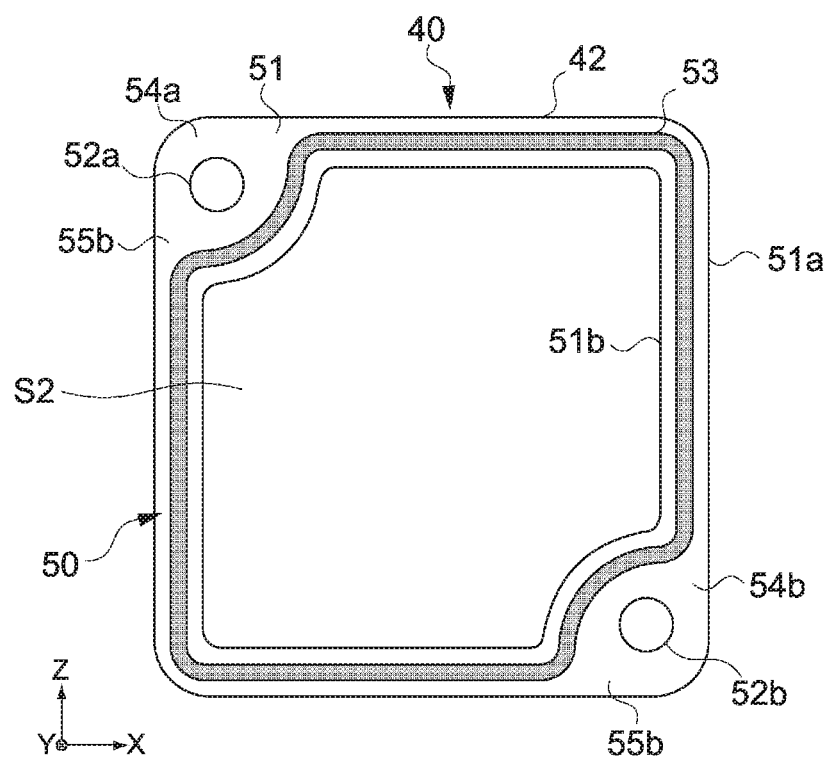
FIG. 6 schematically illustrates a configuration example of a rear case, and illustrates an edge of a lateral face of the rear case.

FIG. 6 schematically illustrates a configuration example of the rear case 40, and schematically illustrates the edge of the lateral face 42. In the following description, the edge of the lateral face 42 that is connected to the first connection portion 20 of the front case 10 is referred to as a second connection portion 50.

The second connection portion 50 includes a principal surface portion 51, fastening holes 52a and 52b, and a protrusion 53. The principal surface portion 51 is annularly formed to have an approximately rectangular shape as viewed from the front-rear direction (the Y direction). The principal surface portion 51 is formed to surround the space S2 in the rear case 40.

The shape of the principal surface portion 51 as viewed from the front-rear direction (the Y direction) corresponds to the shape of the principal surface portion 21 of the first connection portion 20 of the front case 10. In other words, the respective shapes are designed such that the principal surface portion 21 and the principal surface portion 51 face each other when the first connection portion 20 and the second connection portion 50 are connected to each other. Specifically, as illustrated in FIGS. 3 and 6, the shape of the principal surface portion 21 of the first connection portion 20 and the shape of the principal surface portion 51 of the second connection portion 50 have line symmetry with each other.

The principal surface portion 51 includes an outer peripheral edge 51a and an inner peripheral edge 51b, and fastening hole regions 55a and 55b are respectively provided to two corner portions 54a and 54b from among four corner portions of the principal surface portion 51, the two corner portions 54a and 54b being situated diagonally to each other. The fastening holes 52a and 52b are respectively formed in the fastening hole regions 55a and 55b. The fastening hole 52a is aligned with the fastening hole 22a of the front case 10. The fastening hole 52b is aligned with the fastening hole 22b of the front case 10.

The protrusion 53 is formed all around the principal surface portion 21 to protrude forward from the principal surface portion 51. FIG. 6 illustrates an end of the protrusion 53 in gray.

The protrusion 53 is annularly formed as viewed from the front-rear direction (the Y direction). Further, the protrusion 53 has an approximately rectangular shape as viewed from the front-rear direction (the Y direction). The protrusion 53 is formed along the inner peripheral edge 51b of the principal surface portion 51.

The protrusion 53 is a portion inserted into the groove 23 of the front case 10. Thus, the shape of the protrusion 53 as viewed from the front-rear direction (the Y direction) corresponds to the shape of the groove 23. Specifically, as illustrated in FIGS. 3 and 6, the shape of the groove 23 and the shape of the protrusion 53 have line symmetry with each other. Further, the width of the protrusion 53 is formed to be smaller than the width of the opening 26 of the groove 23.

When the front case 10 and the rear case 40 are connected to each other, the fastening members 1 are respectively inserted into the fastening holes 22a and 52a, and into the fastening holes 22b and 52b, and the inserted fastening members 1 are tightened. Accordingly, a distance between the end of the protrusion 53 and a bottom surface of the groove 23 is made smaller in the front-rear direction (the Y direction). The packing 60 arranged in the groove 23 is sandwiched between the end of the protrusion 53 and the bottom surface of the groove 23 to be pressed from both sides. Consequently, a space between the end of the protrusion 53 and the bottom surface of the groove 23 is hermetically sealed with the packing 60.

In the present embodiment, the fastening holes 22a and 22b formed in the front case 10 correspond to second fastening holes. The fastening holes 52a and 52b formed in the rear case 40 correspond to first fastening holes. Further, in the present embodiment, a connection mechanism is implemented by the fastening holes 22a and 22b, the fastening holes 52a and 52b, and the fastening members 1. A specific configuration of the connection mechanism is not limited, and may be designed discretionarily.

Note that, all around the principal surface portion 51, the surface of the principal surface portion 51 has a coplanar shape that is parallel to the plane (the XZ plane) orthogonal to the front-rear direction (the Y direction). The fastening holes 52a and 52b are through-holes, and openings of the fastening holes 52a and 52b on the side of the principal surface portion 51 are situated at approximately the same level in the front-rear direction (the Y direction) as the surface of the principal surface portion 51. On the other hand, the end of the protrusion 53 is situated anterior in the front-rear direction (the Y direction) relative to the principal surface portion 51.

Figure 7:
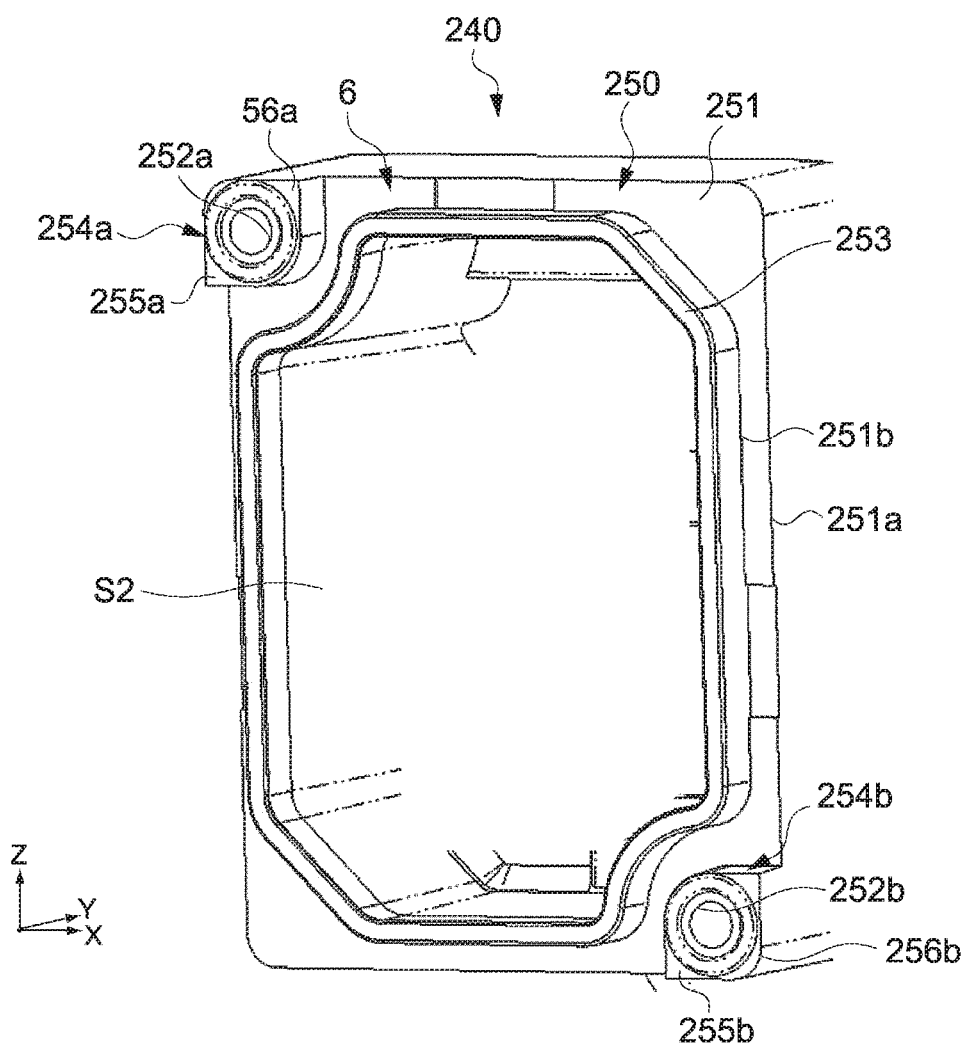
FIG. 7 is a perspective view of another configuration example of the rear case, and illustrates the rear case connected to the front case illustrated in FIG. 4.
Figure 8:
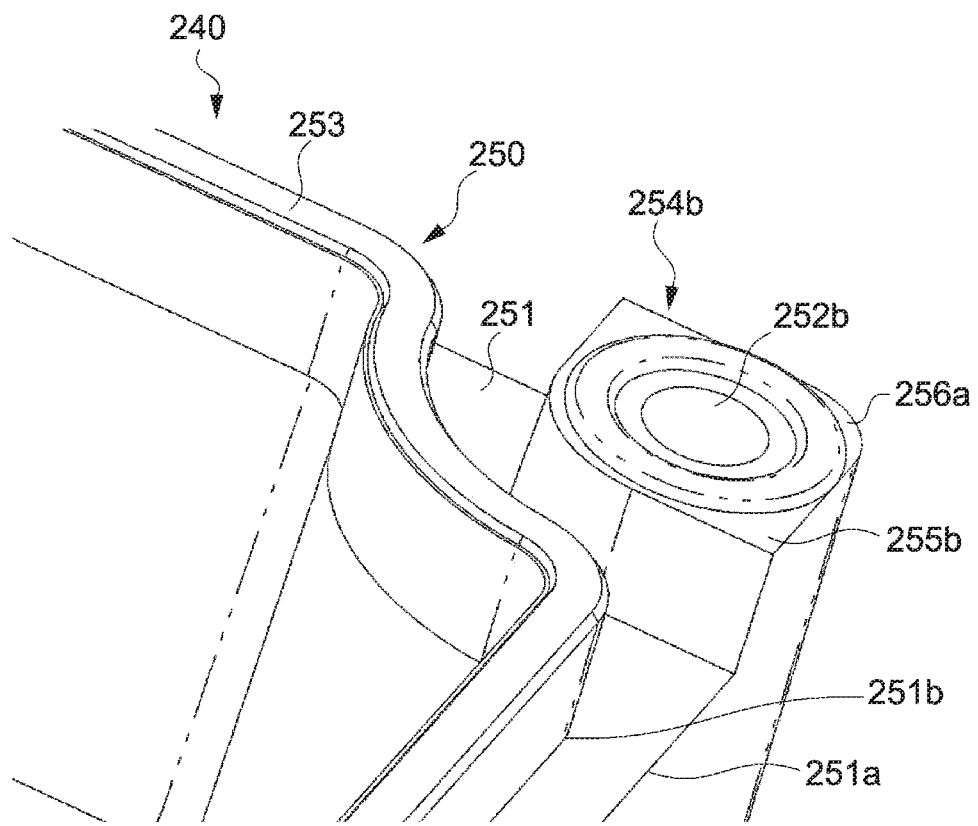
FIG. 8 is an enlarged view of a corner portion b of the rear case illustrated in FIG. 7.

FIG. 7 is a perspective view of another configuration example of the rear case, and illustrates a rear case 240 connected to the front case 210 illustrated in FIG. 4. FIG. 8 is an enlarged view of a corner portion 254b of the rear case 240. Note that FIG. 7 illustrates a center portion of the rear case 240 in white, with a detailed configuration of the inside of the rear case 240 being omitted.

As in the case of the rear case 40 illustrated in FIG. 6, the rear case 240 also includes a second connection portion 250. The second connection portion 250 includes a principal surface portion 251, fastening holes 252a and 252b, and a protrusion 253.

The principal surface portion 251 is annularly formed to have an approximately rectangular shape as viewed from the front-rear direction (the Y direction). In the example illustrated in FIG. 7, the principal surface portion 251 is a portion that faces a portion that is part of the principal surface portion 221 of the first connection portion 220 of the front case 210 and is situated closer to the outer peripheral edge 221a than the groove 223. In other words, the respective shapes of the principal surface portion 221 and the principal surface portion 251 are designed such that the portion that is part of the first connection portion 220 and is situated closer to the outer peripheral edge 221a than the groove 223, and the principal surface portion 251 of the second connection portion 250 face each other.

The principal surface portion 251 includes an outer peripheral edge 251a and an inner peripheral edge 251b. Fastening protrusions 256a and 256b are respectively provided to two corner portions 254a and 254b from among four corner portions of the principal surface portion 251 such that the fastening protrusions 256a and 256b are adjacent to the outer peripheral edge 251a, the two corner portions 254a and 254b being situated diagonally to each other. The fastening protrusions 256a and 256b are provided to protrude forward from the principal surface portion 251.

The surfaces of the fastening protrusions 256a and 256b are fastening hole regions 255a and 255b, respectively, and the fastening holes 252a and 252b are respectively formed in the fastening hole regions 255a and 255b. The fastening holes 252a and 252b are respectively aligned with the fastening holes 222a and 222b of the front case 210.

The protrusion 253 is formed all around the principal surface portion 251 to protrude forward from the principal surface portion 251. As illustrated in FIGS. 7 and 8, the protrusion 253 is formed all around the principal surface portion 251 to be adjacent to the inner peripheral edge 251b of the principal surface portion 251. The protrusion 253 is annularly formed as viewed from the front-rear direction (the Y direction). Further, the protrusion 253 has an approximately rectangular shape as viewed from the front-rear direction (the Y direction).

The protrusion 253 is a portion inserted into the groove 223 of the front case 210. Thus, the shape of the protrusion 253 as viewed from the front-rear direction (the Y direction) corresponds to the shape of the groove 223. Specifically, as illustrated in FIGS. 5 and 7, the shape of the groove 223 and the shape of the protrusion 253 have line symmetry with each other. Further, the width of the protrusion 253 is formed to be smaller than the width of the opening 26 of the groove 223.

The first and second connection portions 220 and 250 are connected to each other by the fastening members 1 being tightened. A distance between an end of the protrusion 253 and a bottom surface of the groove 223 is made smaller in the front-rear direction (the Y direction). The packing 60 arranged in the groove 223 is sandwiched between the end of the protrusion 253 and the bottom surface of the groove 223 to be pressed from both sides. Consequently, a space between the end of the protrusion 253 and the bottom surface of the groove 223 is hermetically sealed with the packing 60.

Note that, all around the principal surface portion 251, the surface of the principal surface portion 251 has a coplanar shape that is parallel to the plane (the XZ plane) orthogonal to the front-rear direction (the Y direction). The rear case 240 is designed such that the surfaces of the fastening protrusions 256a and 256b are situated at approximately the same level in the front-rear direction (the Y direction) as the end of the protrusion 253. Thus, openings of the fastening holes 252a and 252b are situated at approximately the same level as the end of the protrusion 253.

The front case 10 (210) and the rear case 40 (240) are formed of resin material. For example, engineering plastic such as a general-purpose resin such as an acrylonitrile-butadiene-styrene (ABS) resin, a polycarbonate (PC) resin, or a mixture resin of ABS and PC is used as resin material. The resin used for the formation is not limited thereto, and the material and the color (transparency) of the resin used for the formation may be selected as appropriate. Note that the application of the present technology is not limited to resin material, and, for example, die-cast parts made of metallic material may be used as the front case 10 (210) and the rear case 40 (240).

Further, a method for forming the front case 10 (210) and the rear case 40 (240) is also not limited, and, for example, any molding technology may be used to perform the formation.

Figure 9A:
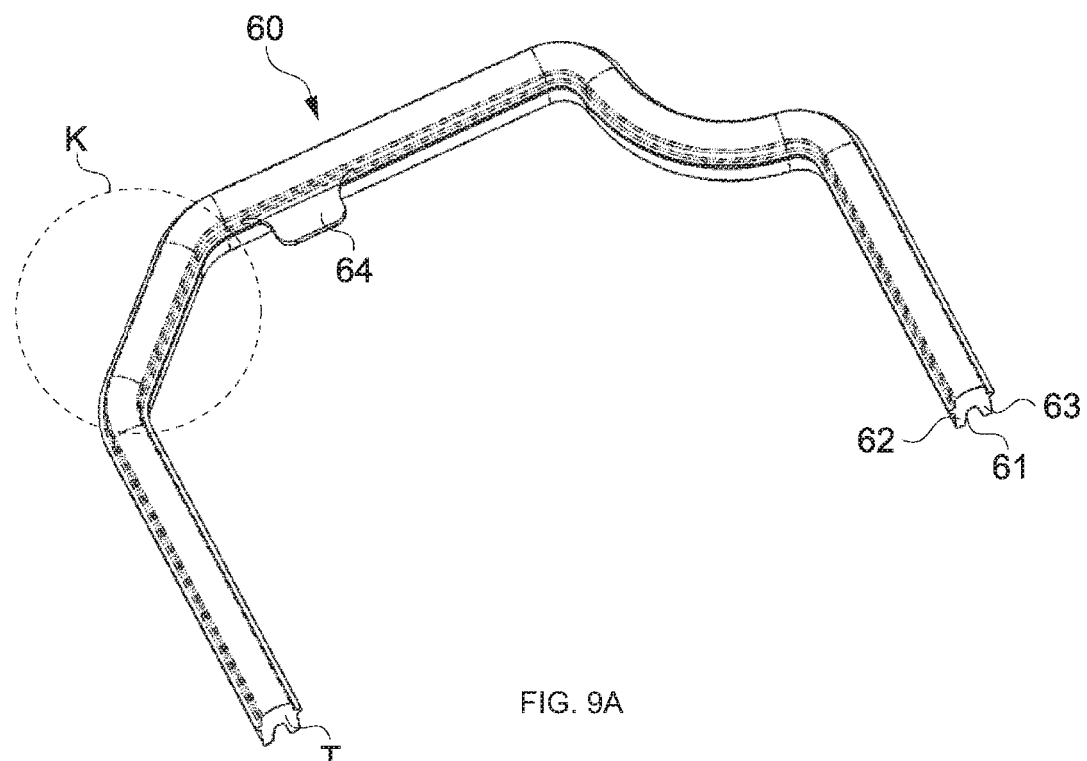
FIGS. 9A and 9B schematically illustrates a configuration example of a packing.
Figure 9B:
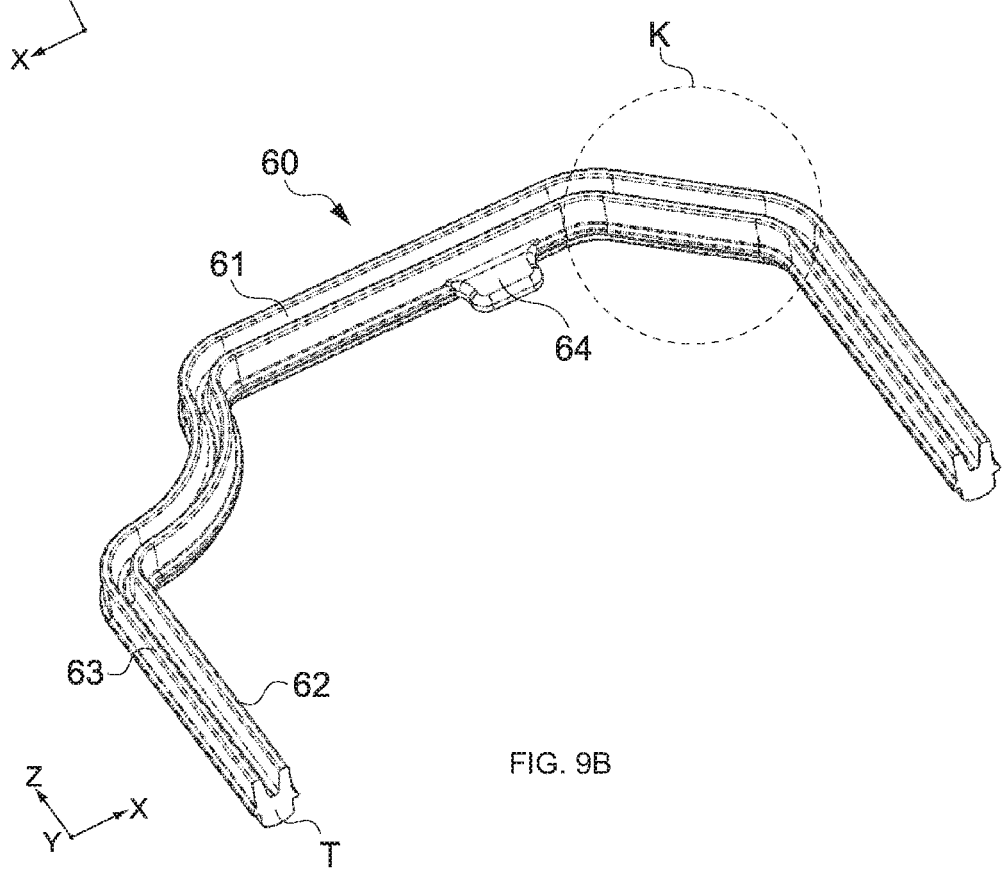

FIGS. 9A and 9B schematically illustrates a configuration example of the packing 60 (an illustration of the Y axis is omitted). For example, it is assumed that the packing 60 is cut along an XY plane at a position corresponding to a dashed line L1 illustrated in FIGS. 3 and 5, the XY plane being orthogonal to a circumferential direction of the packing 60. Note that the circumferential direction of the packing 60 is also a direction along the shape of the annularly formed packing 60.

A portion of the packing 60 illustrated in FIGS. 9A and 9B that is indicated by a dashed circle K has a shape different from the shape of a corresponding portion of the groove 23 (223) illustrated in FIGS. 3 and 5. It is possible to easily adjust the shape of the portion indicated by the circle K to the shape of the groove 23 (223), and thus it is easy to form the packing 60 having a shape corresponding to the shape of the groove 23 (223). Of course, it is also possible to easily adjust the shape of the groove 23 (223) to the shape of the packing 60 illustrated in FIGS. 9A and 9B. At any rate, it is possible to implement the waterproof mechanism according to the present technology by forming the packing 60 having a shape of a cross-section illustrated in FIGS. 9A and 9B, and thus it is possible to provide an excellent waterproof effect.

In the present embodiment, the shape of a cross-section T that is obtained by cutting the packing 60 along the plane that is orthogonal to the circumferential direction of the packing 60, is approximately uniform all around the packing 60. Thus, if the packing 60 is cut at a position different from the position corresponding to the dashed line L1 illustrated in FIGS. 3 and 5, the shape of the cross-section T will be approximately identical to the shape illustrated in FIGS. 9A and 9B.

FIG. 9A illustrates a configuration example of a side (a back side) of the packing 60 that is pressed by the end of the protrusion 53 (253) of the rear case 40 (240). FIG. 9B illustrates a configuration example of a side (a front side) of the packing 60 that is pressed by the bottom surface of the groove 23 (223) of the front case 10 (210). Thus, when the packing 60 is attached to the groove 23 (223) of the front case 210, the packing 60 is inserted in an orientation illustrated in FIG. 9A.

As illustrated in FIG. 9B, a concave 61 is formed in an approximate center of the front side of the packing 60 in the circumferential direction all around the packing 60. Thus, the front side of the packing 60 is divided into two portions by the concave 61. Of the two portions obtained by the division, a portion on an inner peripheral side is referred to as a first division foot portion 62, and a portion on an outer peripheral side is referred to as a second division foot portion 63. The first and second division foot portions 62 and 63 are formed in the circumferential direction all around the packing 60.

Note that, as illustrated in FIGS. 9A and 9B, an attachment portion 64 is formed in a certain position of the portion on the inner peripheral side of the packing 60. The attachment portion 64 is a portion arranged in a notch 229 that is situated on an inner peripheral side of the groove 223 illustrated in FIG. 4. The provision of the attachment portion 64 makes it possible to easily estimate an attachment orientation in a bilaterally asymmetrical shape, and this results in being able to prevent the packing 60 from being attached to be oppositely oriented. A cross-section of the certain position in which the attachment portion 64 is formed is slightly different from the cross-sections at the other positions. Note that, in the front case 10 illustrated in FIG. 2, an illustration of the notch in which the attachment portion 64 is arranged is omitted.

Any elastic material such as rubber or plastic may be used as material for the packing 60. In the present embodiment, the packing 60 corresponds to an elastic member.

[Waterproof Mechanism]

The waterproof mechanism according to the present embodiment is described in detail. In the following description, the numerical references used for the configuration examples illustrated in FIGS. 2, 3, and 6 are used as representative numerical references.

Figure 10:
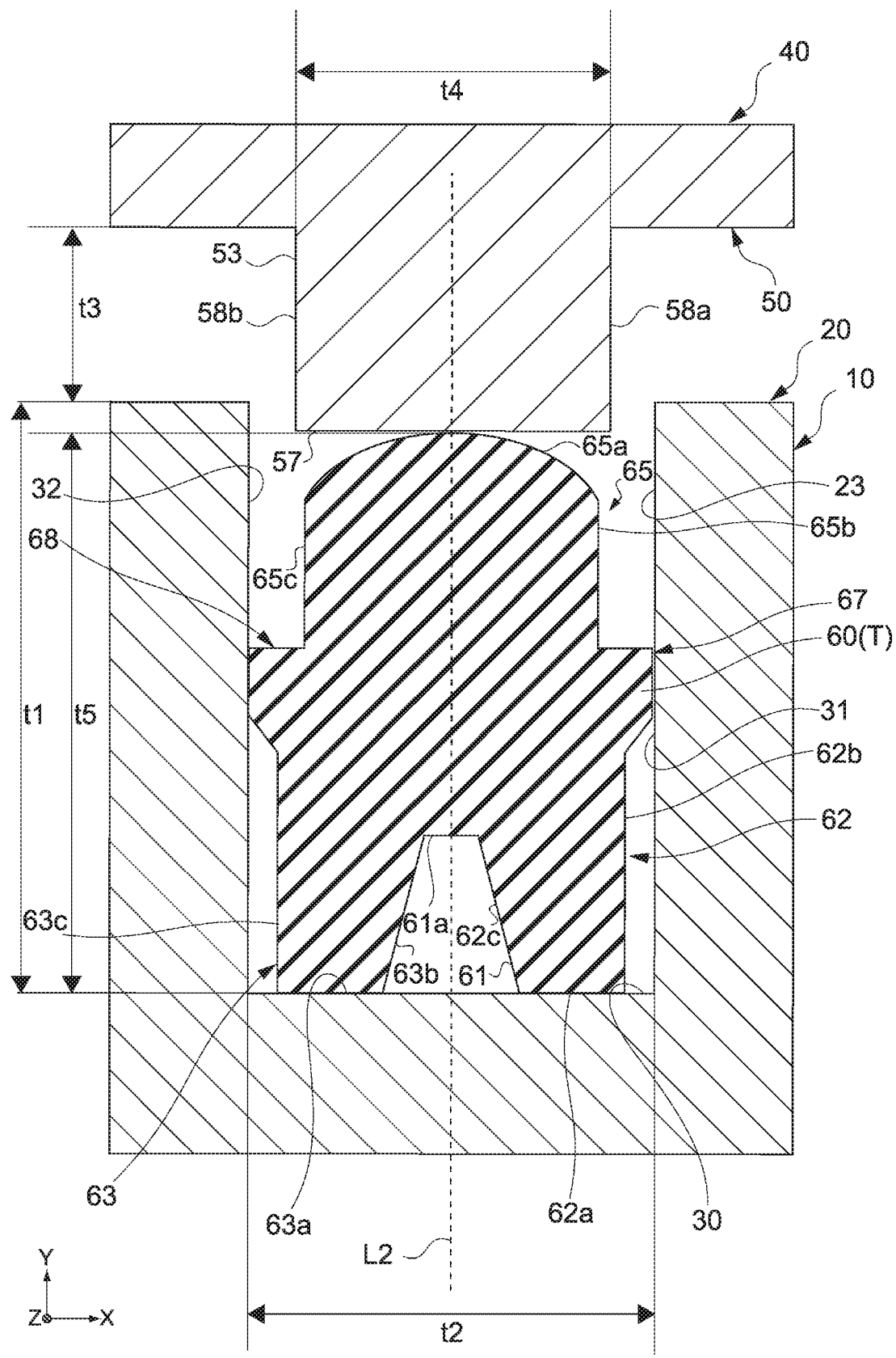
FIG. 10 is a cross-sectional view of a configuration example of cross-sections of a first connection portion, a second connection portion, and the packing in a state before fastening members are tightened.

FIG. 10 is a cross-sectional view of a configuration example of cross-sections of the first connection portion 20, the second connection portion 50, and the packing 60 in a state before the fastening members 1 are tightened. FIG. 10 schematically illustrates the first and second connection portions 20 and 50.

Here, the description is made on the assumption that the described cross-section is a cross-section of a portion on the left in the figure that is situated at the position corresponding to the dashed line L1 illustrated in FIGS. 3 and 5. Of course, the cross-section is not limited to the cross-section of this portion, and a cross-sectional configuration similar to the cross-sectional configuration illustrated in FIG. 10 is obtained at any position in the circumferential direction.

The protrusion 53 includes a first pressing surface 57 that is the end of the protrusion 53, and two lateral surfaces that extend in the front-rear direction (the Y direction) from the principal surface portion 51 to the first pressing surface 57. Of the two lateral surfaces, a lateral surface on the inner peripheral side is referred to as an inner-peripheral lateral surface 58a, and a lateral surface on the outer peripheral side is referred to as an outer-peripheral lateral surface 58b.

The groove 23 includes a second pressing surface 30 that is the bottom surface of the groove 23. The second pressing surface 30 is arranged to face the first pressing surface 57. The first and second pressing surfaces 57 and 30 face each other in the front-rear direction (the Y direction). Thus, in the present embodiment, the front-rear direction (the Y direction) corresponds to a facing direction in which the first and second pressing surfaces 57 and 30 face each other.

Further, the groove 23 includes first and second wall surfaces 31 and 32 that extend in the front-rear direction (the Y direction) and face each other, and the opening 26 that is formed by respective ends of the first and second wall surfaces 31 and 32. In the present embodiment, the first wall surface 31 is situated on the inner peripheral side, and the second wall surface 32 is situated on the outer peripheral side. Of course, the configuration is not limited to this.

Further, the opening 26 has a shape that is approximately identical to the shape of the second pressing surface 30, as viewed from the front-rear direction (the Y direction).

The packing 60 includes a water stop portion 65 that is brought into contact with the first pressing surface 57, the first and second division foot portions 62 and 63 that are brought into contact with the second pressing surface 30, and the concave 61 that is formed between the first and second division foot portions 62 and 63. Further, the packing 60 includes an inner-peripheral-side contact portion 67 that is brought into contact with the first wall surface 31, and an outer-peripheral-side contact portion 68 that is brought into contact with the second wall surface 32.

The water stop portion 65 includes an arc-shaped end 65a, a lateral surface 65b (on the inner peripheral side), and a lateral surface 65c (on the outer peripheral side), the lateral surfaces 65b and 65c extending in the front-rear direction from the arc-shaped end 65a. The water stop portion 65 is configured such that the top of the arc-shaped end 65a is brought into contact with approximately the center of the first pressing surface 57. Thus, in the present embodiment, the water stop portion 65 is brought into contact with the first pressing surface 57 at one point. Note that clearances are respectively formed between the lateral surface 65b and the first wall surface 31, and between the lateral surface 65c and the second wall surface 32. In the present embodiment, the water stop portion 65 corresponds to a first contact portion.

Note that the first pressing surface 57 and the end 65a of the water stop portion 65 can also be referred to as a water stop surface of the waterproof mechanism.

The first division foot portion 62 includes an end 62a, a lateral surface 62b on the inner peripheral side, and a lateral surface 62c on the outer peripheral side. The second division foot portion 63 includes an end 63a, a lateral surface 63b on the inner peripheral side, and a lateral surface 63c on the outer peripheral side. The end 62a of the first division foot portion 62 is brought into contact with a region on the inner peripheral side of the second pressing surface 30. The end 63a of the second division foot portion 63 is brought into contact with a region on the outer peripheral side of the second pressing surface 30. In the present embodiment, the first and second division foot portions 62 and 63 correspond to a plurality of second contact portions.

Thus, the packing 60 is brought into contact with the second pressing surface 30 at a plurality of points. Note that the end 62a of the first division foot portion 62 and the end 63a of the second division foot portion 63 are formed to be situated at approximately the same level in the front-rear direction (the Y direction) as each other.

As illustrated in FIG. 10, in the present embodiment, the first and second division foot portions 62 and 63 are formed to have approximate line symmetry with each other with respect to a center line L2 that passes through the center of the packing 60 to extend in the front-rear direction (the Y direction).

The concave 61 is formed by a bottom surface 61a that is formed in a middle portion of the packing 60 in the front-rear direction (the Y direction), the lateral surface 62c on the outer peripheral side of the first division foot portion 62, and the lateral surface 63b on the inner peripheral side of the second division foot portion 63. The concave 61 is formed to have a shape approximately linearly symmetric with respect to the center line L2.

In the present embodiment, the lateral surface 62c on the outer peripheral side of the first division foot portion 62 is a tapered surface that tilts to the inner peripheral side from the bottom surface 61a to the end 62a. The lateral surface 63b on the inner peripheral side of the second division foot portion 63 is a tapered surface that tilts to the outer peripheral side from the bottom surface 61a to the end 63a. Thus, the concave 61 is formed to have an opening that is larger in area at a position closer to the second pressing surface 30.

On the other hand, it is assumed that the first and second division foot portions 62 and 63 are cut along the plane orthogonal to the front-rear direction (the Y direction). In this case, the cross-section is smaller in area at a cut position closer to the second pressing surface 30. Note that it can also be said that the first and second division foot portions 62 and 63 are formed to diverge from each other in the middle portion in which the bottom surface 61a of the concave 61 is formed, and to each extend toward the second pressing surface 30.

The inner-peripheral-side contact portion 67 brought into contact with the first wall surface 31 is formed to protrude toward the first wall surface 31 from the lateral surface 65b of the water stop portion 65 and the lateral surface 62b on the inner peripheral side of the first division foot portion 62. The outer-peripheral-side contact portion 68 brought into contact with the second wall surface 32 is formed to protrude toward the second wall surface 32 from the lateral surface 65c of the water stop portion 65 and the lateral surface 63c on the outer peripheral side of the second division foot portion 63.

The inner-peripheral-side contact portion 67 and the outer-peripheral-side contact portion 68 are respectively arranged to be situated at the same level in the front-rear direction (the Y direction) as each other. In the present embodiment, the inner-peripheral-side contact portion 67 and the outer-peripheral-side contact portion 68 are respectively arranged in a middle portion in the front-rear direction (the Y direction) between the end 65a of the water stop portion 65 and the end 62a of the first division foot portion 62 and in a middle portion between the end 65a of the water stop portion 65 and the end 63a of the second division foot portion 63. The configuration is not limited to this, and may be designed as appropriate.

The inner-peripheral-side contact portion 67 and the outer-peripheral-side contact portion 68 are formed to have approximate line symmetry with each other with respect to the center line L2. In other words, in the present embodiment, the entirety of the packing 60 is formed to have a shape approximately linearly symmetric with respect to the center line L2. In the present embodiment, the inner-peripheral-side contact portion 67 and the outer-peripheral-side contact portion 68 respectively correspond to third and fourth contact portions.

Figure 11:
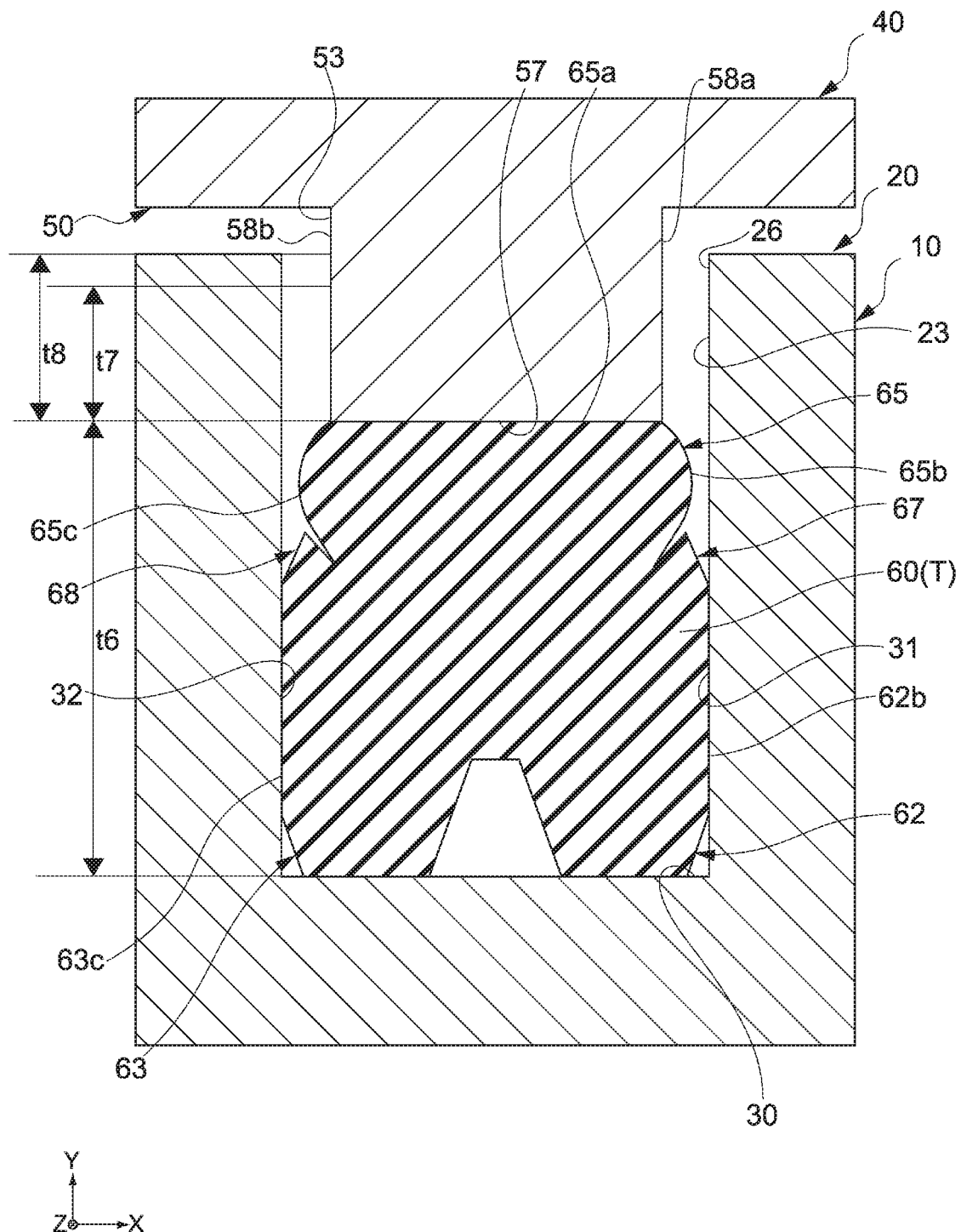
FIG. 11 is a cross-sectional view of a configuration example of the cross-sections of the first connection portion, the second connection portion, and the packing in a state in which the fastening members are tightened.

FIG. 11 is a cross-sectional view of a configuration example of the cross-sections of the first connection portion 20, the second connection portion 50, and the packing 60 in a state in which the front case 10 and the rear case 40 are connected to each other by the fastening members 1 being tightened.

When the fastening members 1 are tightened, the distance between the first pressing surface 57 and the second pressing surface 30 becomes smaller. The first pressing surface 57 enters the inside of the groove 23, and is arranged closer to the second pressing surface 30 than the opening 26 of the groove 23. The water stop portion 65 of the packing 60 is pressed by the first pressing surface 57. Further, the first and second division foot portions 62 and 63 are pressed by the second pressing surface 30.

As illustrated in FIG. 11, the arc-shaped end 65a of the water stop portion 65 is sufficiently deformed, and the lateral surfaces 65b and 65c expand laterally (toward the outer peripheral surface and the inner peripheral surface). In other words, the size of the water stop portion 65 in the front-rear direction (the Y direction) becomes smaller, and the size of the water stop portion 65 in the left-right direction (the X direction) becomes larger.

The first and second division foot portions 62 and 63 are each deformed to expand in the left-right direction (the X direction). In other words, the lateral surface 62b on the inner peripheral side of the first division foot portion 62 expands toward the inner peripheral side to be brought into contact with the first wall surface 31. The lateral surface 63c on the outer peripheral side of the second division foot portion 63 expands toward the outer peripheral side to be brought into contact with the second wall surface 32. The first and second division foot portions 62 and 63 are respectively deformed similarly to each other, and the sizes of the first and second division foot portions 62 and 63 become larger in the left-right direction (the X direction). Note that the shapes of the first and second division foot portions 62 and 63 (the shape of the concave 61) are designed as appropriate such that the first and second division foot portions 62 and 63 are not brought into contact with each other when they are deformed.

The inner-peripheral-side contact portion 67 is deformed to be absorbed into the expansion of the lateral surface 65b of the water stop portion 65 and the expansion of the first division foot portion 62, and the outer-peripheral-side contact portion 68 is deformed to be absorbed into the expansion of the lateral surface 65c of the water stop portion 65 and the expansion of the second division foot portion 63. Note that the positions of the inner-peripheral-side contact portion 67 and the outer-peripheral-side contact portion 68 are designed as appropriate such that the inner-peripheral-side contact portion 67 and the outer-peripheral-side contact portion 68 are situated closer to the second pressing surface 30 than the arc-shaped end 65a of the water stop portion 65 in a state in which the fastening members 1 are tightened.

t1 to t8 illustrated in FIGS. 10 and 11 represent the sizes of portions indicated below.

t1: Size of the groove 23 in the front-rear direction (the Y direction) (depth of the groove 23)

t2: Size of the groove 23 in the left-right direction (the X direction) (width of the groove 23)

t3: Size of the protrusion 53 in the front-rear direction (the Y direction) (height of the protrusion 53)

t4: Size of the protrusion 53 in the left-right direction (the X direction) (width of the protrusion 53)

t5: Size of the packing 60 in the front-rear direction (the Y direction) (height of the packing 60) before compression t6: Size of the packing 60 in the front-rear direction (the Y direction) (height of the packing 60) after compression t7: Compression amount (amount of press of the packing 60 performed by the protrusion 53)

t8: Difference in the position in the front-rear direction (the Y direction) between the opening 26 and the first pressing surface 57 (entrance amount of the first pressing surface 57) after compression In the present embodiment, each size is designed such that the compression amount t7 is a specified amount all around the packing 60 in a state in which the fastening members 1 are tightened. Specifically, each size is designed such that a contact pressure (a reaction force) applied on the first pressing surface 57 by the water stop portion 65 of the deformed packing 60 exhibits a value that is not less than a specified value. The specified value is a value with which a satisfactory waterproof effect is provided, and is set as appropriate. In the present embodiment, the shape of the deformed packing 60 is designed such that an amount of deformation of the water stop portion 65 is largest.

Further, each size is designed such that, in a state in which the fastening members 1 are tightened, a contact pressure applied on the second pressing surface 30 by the first and second division foot portions 62 and 63 exhibits a value that is not less than a specified value. The specified value in this case is typically, for example, the same as the value set with respect to the case of the water stop portion 65 and the first pressing surface 57, but a slightly smaller value may be set to be the specified value. It is possible to achieve a high waterproof performance with a slightly low contact pressure, since the first and second division foot portions 62 and 63 are brought into contact with the second pressing surface 30 on the bottom side of the groove 23.

Note that each size is also designed considering that, in a state in which the fastening members 1 are tightened, an excessive reaction force is not generated since the compression amount t7 is too large. This point will be described later.

Further, as described above, each size is designed such that the entrance amount t8 of entrance of the first pressing surface 57 into the groove 23 is ensured in a state in which the fastening members 1 are tightened. This point will be described later.

Furthermore, each size is designed such that clearances are respectively formed between the second wall surface 32 of the groove 23 and the outer-peripheral lateral surface 58b of the protrusion 53, and between the first wall surface 31 of the groove 23 and the inner-peripheral lateral surface 58a of the protrusion 53. For example, the width of a clearance is designed as appropriate such that the front case 10 and the rear case 40 can be connected to each other without any trouble even if a variation in component dimension occurs due to, for example, an inward warpage occurring upon molding the front case 10 and the rear case 40. This makes it possible to improve an operational performance in assembling the image-capturing apparatus 100. Further, the size t4 is designed as appropriate such that the first pressing surface 57 is brought into contact with the end 65a of the water stop portion 65 of the packing 60 with certainty even if such a variation in component dimension occurs.

Figure 12:
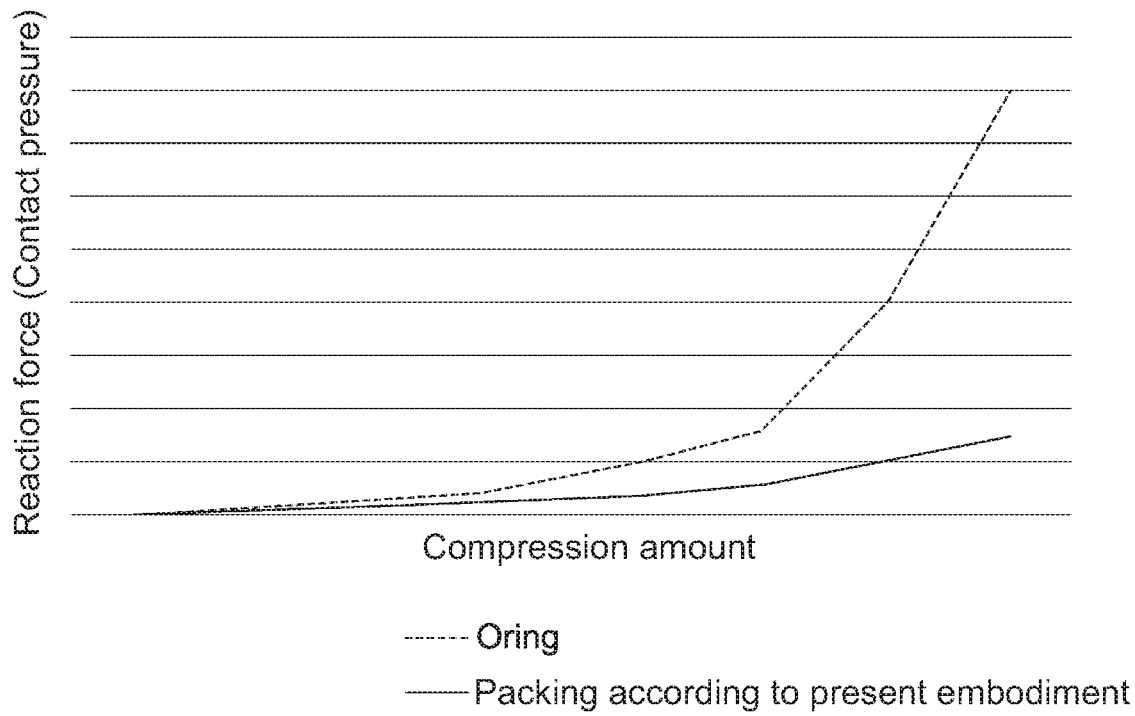
FIG. 12 is a graph schematically illustrating a relationship between a compression amount and a contact pressure (a reaction force).

FIG. 12 is a graph schematically illustrating a relationship between a compression amount and a contact pressure (a reaction force). In addition to a graph related to the packing 60 according to the present embodiment, FIG. 12 illustrates a graph related to an O-ring as a comparative example.

Since the O-ring has an approximately circular cross-section, the O-ring exhibits a high rate of an increase in a reaction force depending on a compression amount, and the reaction force is sharply increased when the compression amount exceeds a specified amount.

It is assumed that the O-ring having such characteristics is attached to the groove 23 instead of the packing 60 and the fastening members 1 are respectively inserted to be tightened at the two corner portions facing each other. In this case, it is very difficult to apply a contact pressure exhibiting a value that is not less than a specified value on the first pressing surface 57 all around the O-ring.

For example, if the fastening members 1 are tightened even a little too much, an excessive reaction force is generated that is applied on the first pressing surface 57 by the O-ring. Thus, a portion to which the fastening member 1 is not attached fails in bearing a reaction force applied by the O-ring, and thus, in this portion, the first pressing surface 57 is pushed back to deform (raise) the second connection portion 50. This results in being unable to apply a sufficient contact pressure on this portion and thus in decreasing a waterproof performance. Of course, if there is not a sufficient compression amount, this also results in being unable to apply a sufficient contact pressure and thus in decreasing a waterproof performance.

Further, it is assumed that a portion in which there is not a sufficient compression amount is generated due to, for example, dimensional tolerance or erection tolerance. In the case of the O-ring, there is a good possibility that a sufficient contact pressure will not be applied if a compression amount is even a little insufficient, since the reactive force varies sensitively with respect to a compression amount. This results in being very difficult to achieve a high waterproof performance.

In other words, when the O-ring is used, it is necessary to perform tightening work with a very high degree of accuracy in order to achieve an adequate contact pressure all around the O-ring, and this results in a very low operational performance in assembly. Further, a variation in tolerance or the like affects greatly, and thus it is not possible to guarantee a necessary waterproof performance.

On the other hand, in the case of the packing 60 according to the present embodiment, the first and second division foot portions 62 and 63 are deformed to expand in the left-right direction (the X direction). Thus, it is possible to suppress an increase in a reaction force depending on a compression amount. Further, it is also possible to prevent a sharp increase in a reaction force with respect to compression, as caused in the case of the O-ring.

This makes it possible to make the compression amount t7 larger, compared to the case of the O-ring, the compression amount t7 being an amount for achieving a contact pressure exhibiting a value that is not less than a specified value. In other words, it is possible to yield, all around the packing 60, the compression amount t7 for achieving an adequate contact pressure.

This makes it possible to sufficiently prevent an excessive reaction force from being generated due to overtightening. Further, it is also possible to sufficiently prevent the compression amount t7 from being insufficient due to a tightening amount being insufficient. Since the reaction force varies slowly with respect to the compression amount, a range of a change in the compression amount between a state in which there is not a sufficient contact pressure and a state in which an excessive contact pressure is generated, is wide. Thus, it is possible to easily include, in the range, a state in which the tightening of the fastening members 1 has been completed. This results in being able to generate an adequate contact pressure (a contact pressure exhibiting a value that is not less than a specified value) all around the packing 60.

It is assumed that a portion in which a compression amount is small is generated due to, for example, dimensional tolerance or erection tolerance. In this case, it is also possible to sufficiently prevent the contact pressure from being insufficient since the compression amount is reduced from a sufficient-compression state. In other words, even if the compression amount is reduced due to, for example, tolerance, the reduced compression amount is included in a range of a change in the compression amount between a state in which there is not a sufficient contact pressure and a state in which an excessive contact pressure is generated, since the range of the change in the compression amount is wide. Thus, it is possible to generate an adequate contact pressure (a contact pressure exhibiting a value that is not less than a specified value).

In other words, in the case of the packing 60 according to the present embodiment, it is possible to improve an operational performance in assembly since it is possible to decrease the degree of accuracy necessary to perform tightening work. Further, it is possible to sufficiently guarantee a necessary waterproof performance since it is also possible to absorb a variation in tolerance or the like. Furthermore, it is possible to provide robustness against deterioration caused by aging such as creep, since it is possible to make the compression amount larger.

As described above, this waterproof mechanism is of course applicable to a housing made of metallic material. Note that, when metallic material is used, it is difficult to provide a lighter apparatus at low cost.

In the present embodiment, it is possible to adjust generation of a contact pressure (a reaction force) with respect to a compression amount by designing a shape of a cross-section of the packing 60 as appropriate. This makes it possible to form the front case 10 and the rear case 40 using resin material, and to reduce the number of fastening members 1. This results in being able to provide a smaller and lighter apparatus at low cost.

Further, as illustrated in FIG. 11, in the case of the waterproof mechanism according to the present embodiment, the entrance amount t8 of entrance of the first pressing surface 57 into the groove 23 is ensured in a state in which the fastening members 1 are tightened. In other words, a maze-like configuration sharply bent at one point (hereinafter referred to as a maze structure) is provided between the outside of the image-capturing apparatus 100 and the water stop surface (the first pressing surface 57 and the end 65a of the water stop portion 65).

This makes it possible to prevent water coming from the outside of the image-capturing apparatus 100 from directly running into the water stop surface. This results in being able to achieve a high waterproof performance. Note that a specific magnitude of the entrance amount t8 is not limited, but it is possible to improve a waterproof performance by making the entrance amount t8 larger. Note that it is also possible to provide a smaller apparatus by reducing the entrance amount t8.

Figure 13:
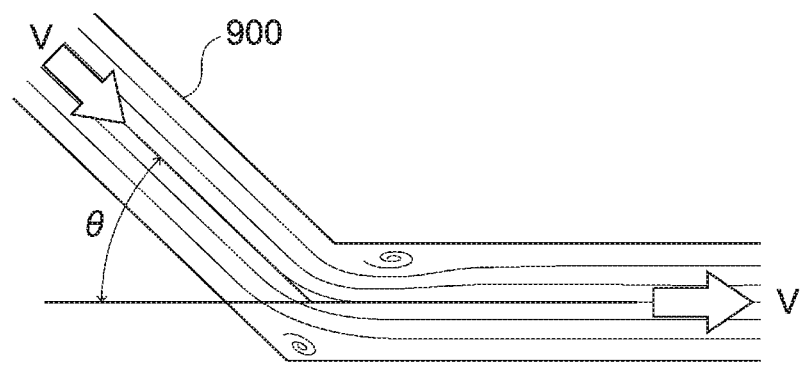
FIG. 13 is a diagram describing a turning loss (an elbow).

FIG. 13 is a diagram describing a turning loss (an elbow). A portion in which a tube 900 is sharply bent is referred to as an elbow, where a flow separation phenomenon occurs and a loss is caused. The following formula holds when v represents a flow rate.

$$\Delta P_{se} = \zeta_e \frac{\rho \cdot v^2}{2} \quad \text{[Formula 1]}$$

ζe represents a loss coefficient, and a large number of experimental results shows that the loss coefficient is approximately obtained using the following formula, where θ represents an angle of an elbow.

$$\zeta_e = 0.946 \cdot \sin^2 \frac{\theta}{2} + 2.047 \cdot \sin^4 \frac{\theta}{2} \quad \text{[Formula 2]}$$

As described above, also in terms of a turning loss (an elbow), the adoption of a maze structure makes it possible to reduce water pressure applied on the water stop portion 65. This results in being able to improve a waterproof performance.

Further, as illustrated in FIG. 10, the inner-peripheral-side contact portion 67 brought into contact with the first wall surface 31 and the outer-peripheral-side contact portion 68 brought into contact with the second wall surface 32 are each arranged in a middle portion of the packing 60 in the front-rear direction (the Y direction).

Consequently, the packing 60 is in a well-balanced state when the packing 60 is inserted into the groove 23, and this makes it possible to easily arrange the end 65a of the water stop portion 65 at the center of the first pressing surface 57. In other words, it is possible to prevent the packing from being arranged offset from the groove 23 in the left-right direction, and to easily perform centering (positioning). Further, it is also possible to prevent the packing 60 from getting twisted when the packing 60 is inserted.

Furthermore, the use of the inner-peripheral-side contact portion 67 and the outer-peripheral-side contact portion 68 makes it possible to prevent water from entering, and this makes it possible to improve a waterproof performance.

Note that, in a state in which the fastening members 1 are tightened, the positions of the inner-peripheral-side contact portion 67 and the outer-peripheral-side contact portion 68 are designed as appropriate such that the inner-peripheral-side contact portion 67 and the outer-peripheral-side contact portion 68 are situated closer to the second pressing surface 30 in the front-rear direction (the Y direction) than the end 65a of the water stop portion 65. This prevents the packing 60 from getting twisted when the packing 60 is compressed. Further, the twist of the packing 60 when being compressed is prevented by performing designing such that the first and second division foot portions 62 and 63 are brought into contact with each other upon compression.

The inventors performed the water resistance test defined in IPX9K (ISO20653 JISD5020) with respect to the image-capturing apparatus 100 for which the waterproof mechanism according to the present technology has been adopted. Note that the following are the test conditions defined in IPX9K.

Placing a subject under test on a rotating base and rotating the subject under test at 5+/−1 rpm
Distance between a sample and a nozzle: 10 to 15 cm
Performing spraying for 30 seconds at respective positions of 0 degrees, 30 degrees, 60 degrees, and 90 degrees from vertical
Water amount: 14 to 16 L/min
Water pressure: 8000 to 10000 kPa
Water temperature: 80+/−5 degrees Celsius
Test time: 2 minutes In the water resistance test using the high temperature and pressure water, there was no entrance of water into the inside of the apparatus, and a very favorable result was obtained.

As described above, in the image-capturing apparatus 100 according to the present embodiment, the water stop portion 65 brought into contact with the first pressing surface 57 is formed in a cross-section of the packing 60 hermetically sealing a space between the first and second pressing surfaces 57 and 30. Further, the first and second division foot portions 62 and 63 brought into contact with the second pressing surface 30 arranged to face the first pressing surface 57 are formed. This makes it possible to improve a sealing performance of the packing 60. This results in being able to achieve a high waterproof performance. Furthermore, it is possible to provide a smaller apparatus since it is possible to reduce the number of fastening members 1.

With respect to a vehicle-mounted camera, strict size-constraints are placed, whereas the specifications of environment resistance, water resistance, and the like are tightened. In particular, with respect to water resistance, there is a need to prevent high temperature and pressure water from entering the inside of an apparatus, as defined representatively in IPX9K in recent years. For example, a technique of hermetically sealing a space between cases has been applied in order to ensure such water resistance and to provide a smaller apparatus, the technique including welding using, for example, ultrasound or a laser, and bonding using, for example, an adhesive. However, the techniques have respective issues. Ultrasound welding may cause damage to internal parts or generate burr or dust due to vibrational energy. With respect to laser welding, there is a material constraint, and facilities are generally very expensive. With respect to bonding, a control of conditions for applying and hardening an adhesive is an issue. Thus, there is a need to provide a smaller apparatus while using a packing in order to ensure a waterproof performance by a general mechanical tightening method (screwing).

In the present embodiment, it is possible to adjust generation of a contact pressure (a reaction force) with respect to a compression amount by designing a shape of a cross-section of the packing 60 as appropriate. This makes it possible to provide a smaller apparatus (by reducing the number of screws) while ensuring a waterproof performance by a general mechanical tightening method. Further, it is possible to provide a lighter apparatus at low cost.

<Other Embodiments>

The present technology is not limited to the embodiments described above, and may achieve other various embodiments.

Figure 14:
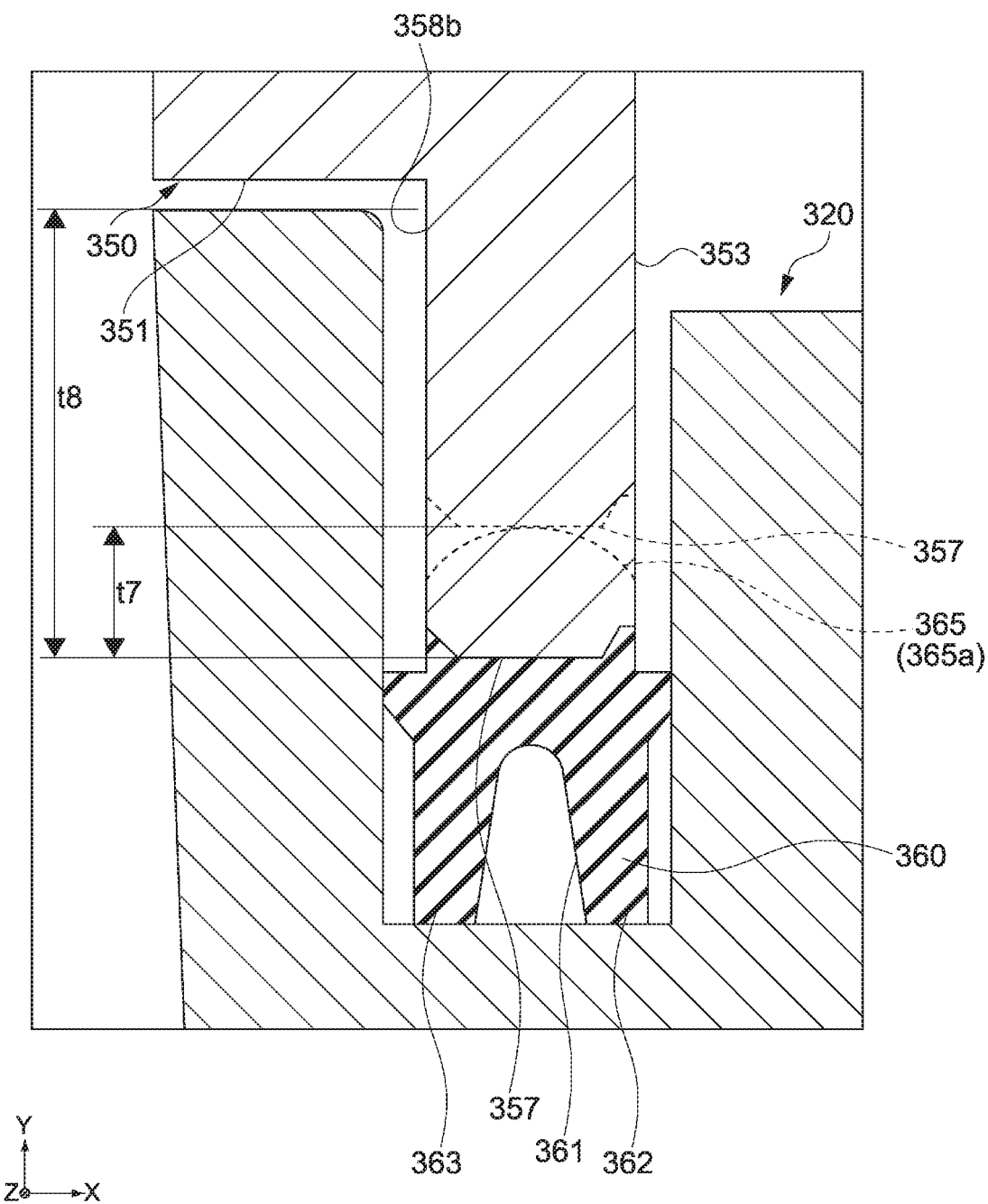
FIG. 14 is a cross-sectional view of another configuration example of the first and second connection portions.

FIG. 14 is a cross-sectional view of another configuration example of the first and second connection portions. Note that FIG. 14 illustrates a state before a packing 360 is compressed, where the illustration is made to make it easy to intuitively understand the compression amount t7 upon compression. Note that the dashed lines indicate a first pressing surface 357 of a protrusion 353 and an end 365*a* of a water stop portion 365 before compression.

In the case of first and second connection portions 320 and 350 illustrated in FIG. 14, a principal surface portion 351 of the second connection portion 350 is formed only on the outer peripheral side of the protrusion 353. In other words, the protrusion 353 is formed on an end on the inner peripheral side of the principal surface portion 351. This configuration corresponds to the configuration examples illustrated in FIGS. 4, 5, 7, and 8.

Further, the entrance amount t8 of entrance of the first pressing surface 357 into a groove 323 is sufficiently ensured. Thus, water entering through a space runs into an outer-peripheral lateral surface 358*b* of the protrusion 353 to be attenuated, and water pressure applied on the water stop portion 365 is sufficiently reduced. This results in achieving a high waterproof performance.

Further, in the example illustrated in FIG. 14, the shape of the packing 60 is slightly different, where the sizes of first and second division foot portions 362 and 362 in the front-rear direction (the Y direction) (the size of a concave 361) are large. Of course, such a configuration may be adopted. Moreover, various designs are conceivable.

Figure 15:
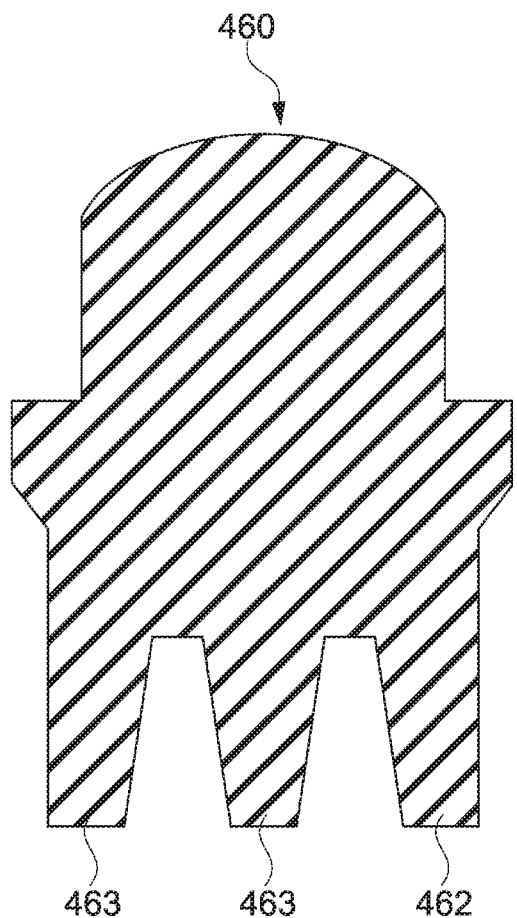
FIG. 15 is a cross-sectional view of another configuration example of the packing.

FIG. 15 is a cross-sectional view of another configuration example of the packing. As in the case of this packing 460, three division foot portions 462, 463, and 464 may be formed as a plurality of second contact portions brought into contact with the second pressing surface. In other words, the number of points of contact with the second pressing surface is not limited, and any number not less than two may be adopted. If each division foot portion is deformable in the left-right direction and if it is possible to suppress an increase in a contact pressure (a reaction force) with respect to a compression amount, it is possible to provide an effect similar to the effect described above.

The shape of the water stop portion (the first contact portion) brought into contact with the first pressing surface may also be designed discretionarily. For example, the water stop portion may be formed to have an end having a shape other than an arc, such as a rectangular shape. It is possible to adjust a contact pressure and the like by designing a shape of the water stop portion as appropriate.

Figure 16:
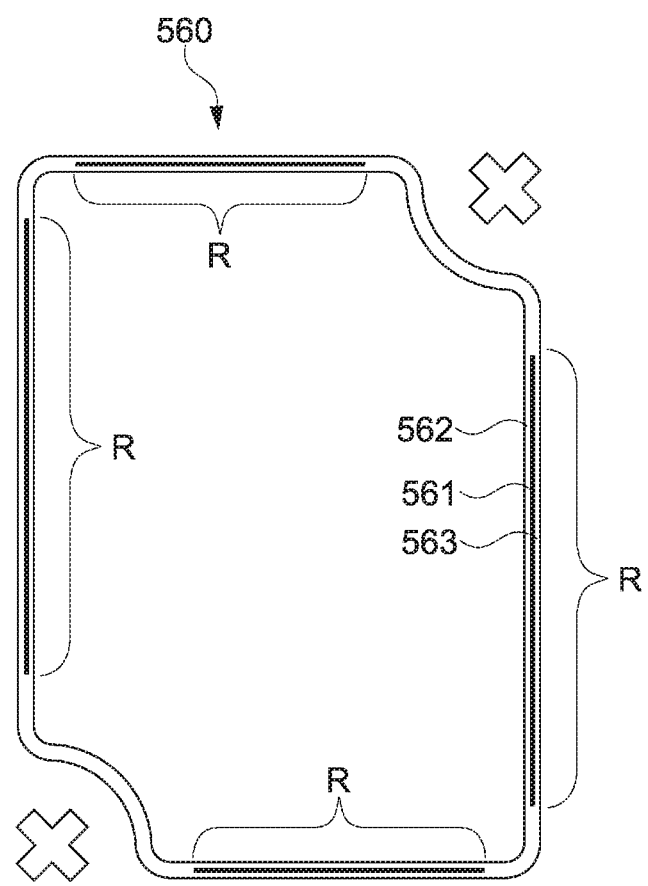
FIG. 16 is a cross-sectional view of another configuration example of the packing.

FIG. 16 is a cross-sectional view of another configuration example of the packing. A concave 561 is formed only in some regions R of a packing 560 illustrated in FIG. 16. Thus, first and second division foot portions 562 and 563 are formed only in the regions. As described above, the water stop portion (the first contact portion) and the first and second division foot portions 562 and 563 (a plurality of second contact portions) may be formed in at least some of the cross-sections of the packing 560. Such a configuration also makes it possible to adjust generation of a contact pressure (a reaction force) with respect to a compression amount. For example, the concave 561 is formed in a limited position such that a necessary contact pressure can be ensured even in a portion situated away from a tightening portion, and the shape of the cross-section is changed. This makes it possible to achieve a high waterproof performance and to provide a smaller and lighter apparatus at low cost.

The waterproof mechanism according to the present technology is applicable to any housing component. For example, the present technology is applicable to any housing component that makes up a TV, a laptop PC, a tablet terminal, a smartphone, a digitizer, a personal digital assistant (PDA), a portable AV player, a digital still camera, a camcorder, a game device, an electronic book terminal, and the like.

APPLICATION EXAMPLE

The technology according to the present disclosure can be applied to various products. For example, the technology according to the present disclosure may be provided as an image-capturing apparatus mounted on any kind of mobile object such as vehicle, electric vehicle, hybrid electric vehicle, motorcycle, bicycle, personal mobility, airplane, drone, ship, robot, construction machinery, or agricultural machinery (tractor).

Figure 17:
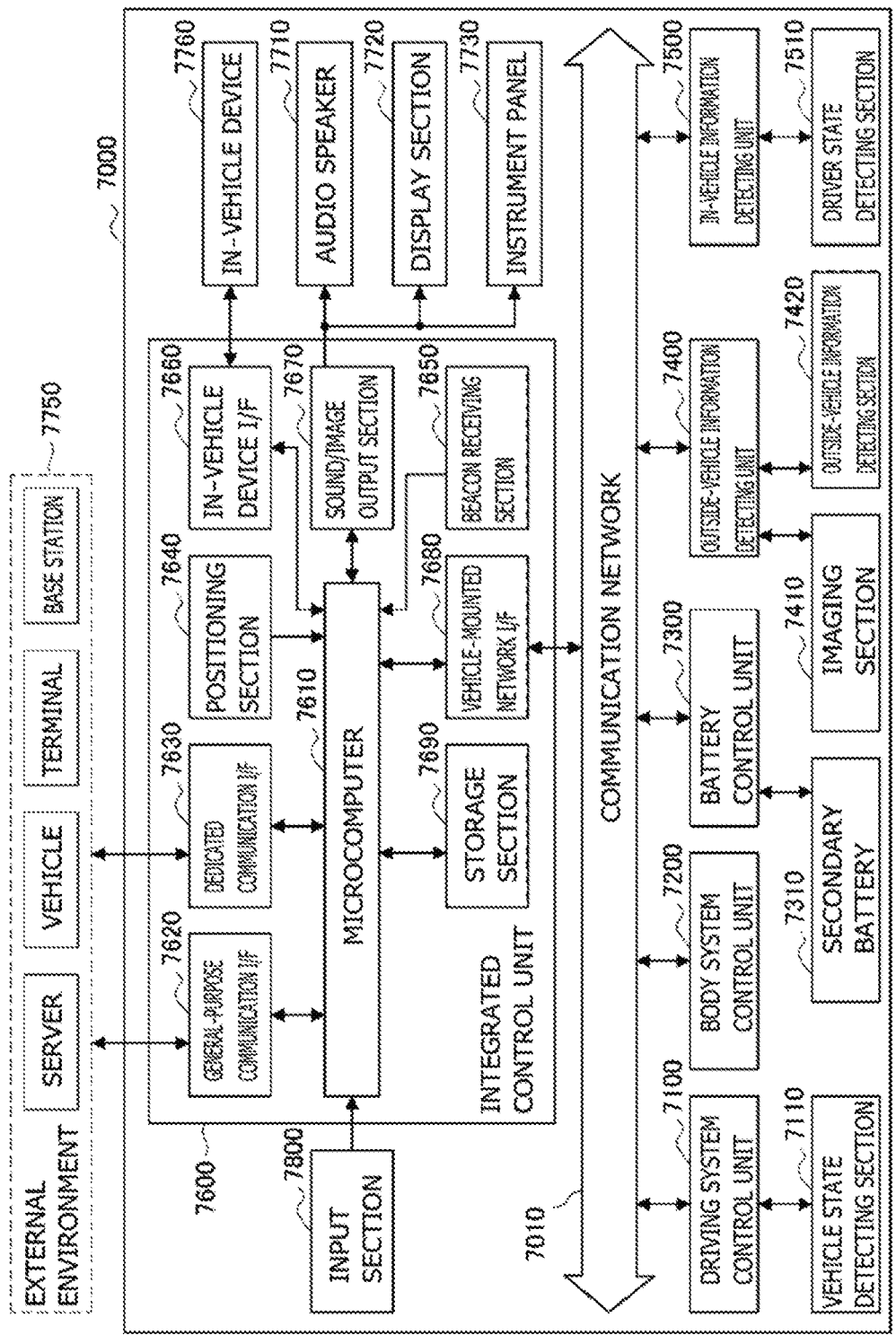
FIG. 17 is a block diagram depicting an example of schematic configuration of a vehicle control system.

FIG. 17 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 17, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 17 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 18:
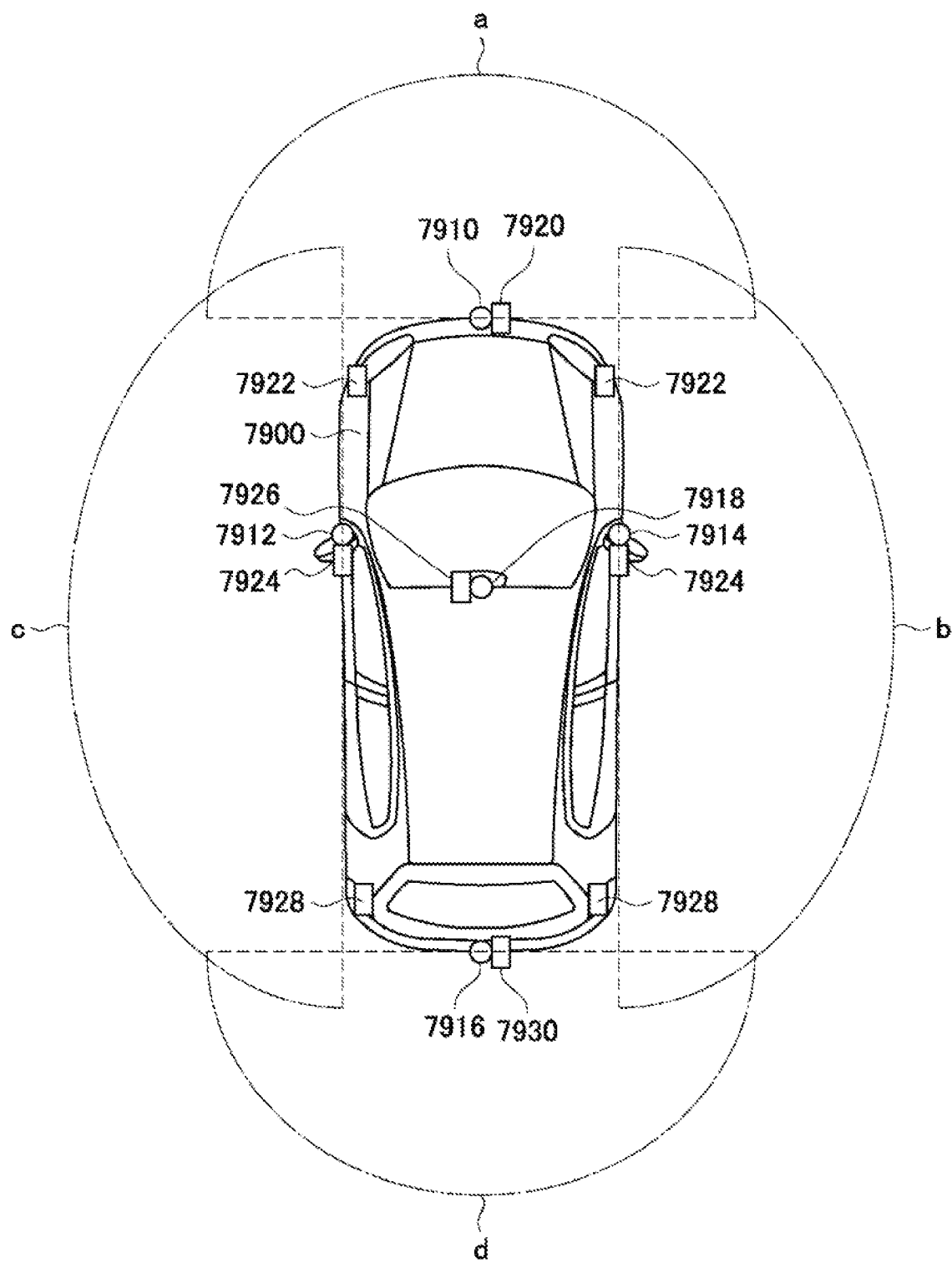
FIG. 18 is a diagram of assistance in explaining an example of installation positions of an outside-vehicle information detecting section and an imaging section.

FIG. 18 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 18 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 17, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 17, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 17 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

The respective configurations of the image-capturing apparatus, the front case, the rear case, the packing, and the like described with reference to the respective figures are merely embodiments, and may be deformed discretionarily without departing from the spirit of the present technology. In other words, any other configurations for practicing the present technology may be adopted.

In the present disclosure, "center", "middle", "uniform", "same/identical", "approximate center/approximately the center", "orthogonal", "parallel", "rectangular", "circular", "coplanar shape", "line symmetry/linearly symmetric", and the like include, in concept, "substantially the center/substantial center", "substantially the middle/substantially middle", "substantially uniform", "substantially the same/substantially identical", "substantially approximate center/substantially approximately the center", and "substantial line symmetry/substantially linearly symmetric". For example, states within respective specified ranges (for example, ranges of +/−10%) are also included, where "exactly the center/exact center", "exactly the middle/exactly middle", "exactly uniform", "exactly the same/exactly identical", "exactly approximate center/exactly approximately the center", "completely orthogonal", "completely parallel", "exactly rectangular", "exactly circular", "exactly coplanar shape", "complete line symmetry/completely linearly symmetric", and the like are respectively used as references for the specified ranges.

At least two of the features of the present technology described above can also be combined. In other words, various features described in the respective embodiments may be combined discretionarily regardless of the embodiments. Further, the various effects described above are not limitative but are merely illustrative, and other effects may be provided.

Note that the present technology may also take the following configurations.

(1) An image-capturing apparatus including:
a first case that includes a first pressing surface;
a second case that includes a second pressing surface arranged to face the first pressing surface, and is connected to the first case;
a connection mechanism that is capable of connecting the first and second cases; and
an elastic member that includes a first contact portion and a second contact portion in at least some of cross-sections of the elastic member, the first contact portion being brought into contact with the first pressing surface, the second contact portion being brought into contact with the second pressing surface, the elastic member including a plurality of the second contact portions, the elastic member hermetically sealing a space between the first and second pressing surfaces.

(2) The image-capturing apparatus according to (1), in which
the first and second cases form an internal space by being connected to each other, and
the image-capturing apparatus further includes an image-capturing section that is arranged in the internal space.

(3) The image-capturing apparatus according to (1) or (2), in which
the second contact portions of the plurality of the second contact portions are formed to diverge from each other in a specified middle portion of the elastic member in a facing direction and to each extend toward the second pressing surface, the facing direction being a direction in which the first and second pressing surfaces face each other.

(4) The image-capturing apparatus according to any one of (1) to (3), in which
the elastic member includes a concave that is formed between the adjacent second contact portions of the plurality of the second contact portions.

(5) The image-capturing apparatus according to (4), in which
the concave is formed to have an opening that is larger in area at a position closer to the second pressing surface.

(6) The image-capturing apparatus according to any one of (1) to (5), in which
the plurality of the second contact portions is formed such that ends of the respective second contact portions of the plurality of the second contact portions are situated at the same level as each other in a facing direction in which the first and second pressing surfaces face each other.

(7) The image-capturing apparatus according to any one of (1) to (6), in which
the first contact portion includes an arc-shaped end.

(8) The image-capturing apparatus according to any one of (1) to (7), in which
the first and second pressing surfaces are each annularly formed as viewed from a facing direction in which the first and second pressing surfaces face each other, and
the elastic member is annularly formed as viewed from the facing direction, and is arranged between the first and second pressing surfaces.

(9) The image-capturing apparatus according to (8), in which
at least some of cross-sections of the elastic member include the first contact portion and the plurality of the second contact portions, the cross-sections of the elastic member being obtained by cutting the elastic member along a plane that is orthogonal to a circumferential direction of the elastic member.

(10) The image-capturing apparatus according to (8) or (9), in which
cross-sections of the elastic member have a uniform shape, the cross-sections of the elastic member being obtained by cutting the elastic member along a plane that is orthogonal to a circumferential direction of the elastic member.

(11) The image-capturing apparatus according to any one of (1) to (10), in which
the second case includes
first and second wall surfaces that face each other and extend in a facing direction from respective edges of the second pressing surface, the facing direction being a direction in which the first and second pressing surfaces face each other, the respective edges of the second pressing surface being situated opposite to each other, and
an opening that is formed by respective ends of the first and second wall surfaces, and faces the second pressing surface in the facing direction, and
the first case is connected to the second case such that the first pressing surface is arranged closer to the second pressing surface than the opening.

(12) The image-capturing apparatus according to any one of (1) to (11), in which
the elastic member includes a third contact portion and a fourth contact portion in the at least some of the cross-sections of the elastic member, the third contact portion being brought into contact with the first wall surface, the fourth contact portion being brought into contact with the second wall surface.

(13) The image-capturing apparatus according to (12), in which
the third and fourth contact portions are respectively arranged to be situated at the same level as each other in a facing direction in which the first and second pressing surfaces face each other.

(14) The image-capturing apparatus according to (13), in which
the plurality of the second contact portions is formed such that ends of the respective second contact portions of the plurality of the second contact portions are situated at the same level as each other in the facing direction in which the first and second pressing surfaces face each other, and
the third and fourth contact portions are each arranged in a middle portion in the facing direction between an end of the first contact portion and the end of a corresponding one of the second contact portions of the plurality of the second contact portions.

(15) The image-capturing apparatus according to any one of (1) to (14), in which
the connection mechanism includes
a first fastening hole that is formed in the first case,
a second fastening hole that is formed in the second case and arranged to face the first fastening, and
fastening members that are respectively inserted into the first and second fastening holes.

(16) The image-capturing apparatus according to any one of (1) to (15), in which
the first and second cases are each formed of resin material.

(17) A housing component including:
a first case that includes a first pressing surface;
a second case that includes a second pressing surface arranged to face the first pressing surface, and is connected to the first case;
a connection mechanism that is capable of connecting the first and second cases; and
an elastic member that includes a first contact portion and a second contact portion in at least some of cross-sections of the elastic member, the first contact portion being brought into contact with the first pressing surface, the second contact portion being brought into contact with the second pressing surface, the elastic member including a plurality of the second contact portions, the elastic member hermetically sealing a space between the first and second pressing surfaces.

REFERENCE SIGNS LIST 1 fastening member
10, 210 front case
22*a*, 222*a* fastening hole
22*b*, 222*b* fastening hole
23, 223, 323 groove
26, 226 opening
30 second pressing surface
31 first wall surface
32 second wall surface
40, 240 rear case
52*a*, 252*a* fastening hole
52*b*, 252*b* fastening hole
53, 253, 353 protrusion
57, 357 first pressing surface
60, 360, 460, 560 packing
61, 561 concave
62, 562 first division foot portion
63, 563 second division foot portion
65, 365 water stop portion
65*a* end of water stop portion
67 inner-peripheral-side contact portion
68 outer-peripheral-side contact portion
100 image-capturing apparatus
462, 463, 464 division foot portion

The invention claimed is:

1. An image-capturing apparatus, comprising:
a first case that includes a first pressing surface;
a second case that includes a second pressing surface, wherein
the second pressing surface faces the first pressing surface, and
the second pressing surface is connected to the first case;
a connection mechanism configured to connect the first case and the second case;
an elastic member that includes a first contact portion and a plurality of second contact portions in at least one cross-section of a plurality of cross-sections of the elastic member, wherein
the first contact portion is configured to contact the first pressing surface,
the plurality of second contact portions is configured to contact the second pressing surface, and
the elastic member is configured to hermetically seal a space between the first pressing surface and the second pressing surface; and
an attachment portion in an inner peripheral side of the elastic member.

2. The image-capturing apparatus according to claim 1, wherein
the first case and the second case are connectable to form an internal space, and
the image-capturing apparatus further comprises an image-capturing section in the internal space.

3. The image-capturing apparatus according to claim 1, wherein
each of third contact portions of the plurality of second contact portions diverge in a middle portion of the elastic member in a facing direction,
each of the third contact portions extends toward the second pressing surface, and
the facing direction corresponds to a direction in which the first pressing surface faces the second pressing surface.

4. The image-capturing apparatus according to claim 1, wherein the elastic member includes a concave that is between adjacent second contact portions of the plurality of second contact portions.

5. The image-capturing apparatus according to claim 4, wherein
the concave comprises an opening, and
an area of the opening is larger at a position closer to the second pressing surface.

6. The image-capturing apparatus according to claim 1, wherein an end portion of each second contact portion of the plurality of second contact portions is at the same level in a facing direction in which the first pressing surface faces the second pressing surface.

7. The image-capturing apparatus according to claim 1, wherein the first contact portion includes an arc-shaped end.

8. The image-capturing apparatus according to claim 1, wherein
each of the first pressing surface and the second pressing surface is annular as viewed from a facing direction in which the first pressing surface faces the second pressing surface,
the elastic member is annular as viewed from the facing direction, and
the elastic member is between the first pressing surface and the second pressing surface.

9. The image-capturing apparatus according to claim 8, wherein
the at least one cross-section of the elastic member includes the first contact portion and the plurality of second contact portions, and
the at least one cross-section of the elastic member constitutes different sections of the elastic member along a plane that is orthogonal to a circumferential direction of the elastic member.

10. The image-capturing apparatus according to claim 8, wherein
the at least one cross-section of the elastic member has a uniform shape, and
the at least one cross-section of the elastic member constitutes different sections of the elastic member along a plane that is orthogonal to a circumferential direction of the elastic member.

11. The image-capturing apparatus according to claim 1, wherein
the second case includes a first wall surface and a second wall surface,
the first wall surface faces the second wall surface,
the first wall surface and the second wall surface extend in a facing direction from respective edges of the second pressing surface,
the facing direction corresponds to a direction in which the first pressing surface faces the second pressing surface,
a first edge of the respective edges of the second pressing surface is opposite to a second edge of the respective edges of the second pressing surface,
an opening is at each end of the first wall surface and the second wall surface,
the opening faces the second pressing surface in the facing direction, and
the first case is connected to the second case such that the first pressing surface is closer to the second pressing surface than the opening.

12. The image-capturing apparatus according to claim 1, wherein
the elastic member further includes a third contact portion and a fourth contact portion in the at least one cross-section the elastic member,
the third contact portion is configured to contact a first wall surface, and
the fourth contact portion is at a specific distance from a second wall surface.

13. The image-capturing apparatus according to claim 12, wherein each of the third contact portion and the fourth contact portion is at the same level in a facing direction in which the first pressing surface faces the second pressing surface.

14. The image-capturing apparatus according to claim 13, wherein
each of the third contact portion and the fourth contact portion is in a middle portion of the elastic member in the facing direction, and
the middle portion is between an end of the first contact portion and an end of the plurality of second contact portions.

15. The image-capturing apparatus according to claim 1, wherein
the connection mechanism includes a first fastening hole that is in the first case,
a second fastening hole that is in the second case,
the second fastening hole faces the first fastening hole, and
fastening members are respectively insertable into the first fastening hole and the second fastening hole.

16. The image-capturing apparatus according to claim 1, wherein each of the first case and the second case includes a resin material.

17. A housing component, comprising:
a first case that includes a first pressing surface;
a second case that includes a second pressing surface, wherein
the second pressing surface faces the first pressing surface, and
the second pressing surface is connected to the first case;
a connection mechanism configured to connect the first case and the second case;
an elastic member that includes a first contact portion and a plurality of second contact portions in at least one cross-section of a plurality of cross-sections of the elastic member, wherein
the first contact portion is configured to contact with the first pressing surface,
the plurality of second contact portions is configured to contact with the second pressing surface,
the elastic member is configured to hermetically seal a space between the first pressing surface and the second pressing surface; and
an attachment portion in an inner peripheral side of the elastic member.

* * * * *